(12) United States Patent
Yamauchi et al.

(10) Patent No.: US 10,178,629 B2
(45) Date of Patent: Jan. 8, 2019

(54) COMMUNICATIONS NODE, SYSTEM, COMMUNICATIONS METHOD, AND COMPUTER PRODUCT

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Yokohama (JP); Toshiya Otomo, Kawasaki (JP); Miyoshi Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 369 days.

(21) Appl. No.: 14/943,226

(22) Filed: Nov. 17, 2015

(65) Prior Publication Data

US 2016/0073355 A1   Mar. 10, 2016

Related U.S. Application Data

(63) Continuation of application No. PCT/JP2013/064292, filed on May 22, 2013.

(51) Int. Cl.
*H04W 52/24* (2009.01)
*H04W 40/12* (2009.01)
(Continued)

(52) U.S. Cl.
CPC .......... *H04W 52/245* (2013.01); *H04B 17/27* (2015.01); *H04W 24/10* (2013.01);
(Continued)

(58) Field of Classification Search
CPC ..... H04W 24/10; H04W 48/16; H04W 72/08; H04W 52/24; H04W 36/18
See application file for complete search history.

(56) References Cited

U.S. PATENT DOCUMENTS

2005/0014515 A1* 1/2005 Suzuki ................. H04W 36/32
  455/456.1
2007/0086388 A1* 4/2007 Kang .................... H04W 36/30
  370/331
(Continued)

FOREIGN PATENT DOCUMENTS

EP  2262188     12/2010
JP  2001-036459  2/2001
(Continued)

OTHER PUBLICATIONS

International Search Report, mailed in connection with PCT/JP2013/064292 and dated Jul. 23, 2013 (2 pages).
(Continued)

*Primary Examiner* — Anez C Ebrahim
(74) *Attorney, Agent, or Firm* — Fujitsu Patent Center

(57) ABSTRACT

A communications node includes a first transmitting circuit configured to transmit to plural communications nodes, a confirmation signal for confirming whether response is possible; a receiving circuit configured to receive from first communications nodes capable of responding among the plural communications nodes, a response signal for the transmitted confirmation signal; a selecting circuit configured to select from among the first communications nodes and based on reception strength of the received response signal, a second communications node to which execution of data processing is requested by the communications node; a strength calculating circuit configured to calculate based on the reception strength of the response signal from the selected second communications node, a transmission strength to the second communications node; and a second transmitting circuit configured to transmit to the second communications node and based on the calculated transmis-
(Continued)

sion strength, a request signal requesting execution of the data processing.

12 Claims, 26 Drawing Sheets

(51) Int. Cl.
*H04W 24/10* (2009.01)
*H04W 72/08* (2009.01)
*H04W 52/28* (2009.01)
*H04W 52/38* (2009.01)
*H04W 52/46* (2009.01)
*H04B 17/27* (2015.01)
*H04W 84/18* (2009.01)
*H04W 48/16* (2009.01)

(52) U.S. Cl.
CPC ......... *H04W 40/12* (2013.01); *H04W 52/283* (2013.01); *H04W 52/383* (2013.01); *H04W 52/46* (2013.01); *H04W 72/087* (2013.01); *H04W 48/16* (2013.01); *H04W 84/18* (2013.01); *Y02D 70/00* (2018.01); *Y02D 70/34* (2018.01)

(56) References Cited

U.S. PATENT DOCUMENTS

| | | |
|---|---|---|
| 2007/0214286 A1 | 9/2007 | Muqattash et al. |
| 2011/0319022 A1 | 12/2011 | Arad et al. |
| 2012/0155301 A1 | 6/2012 | Miyazaki et al. |

FOREIGN PATENT DOCUMENTS

| | | |
|---|---|---|
| JP | 2007-89021 | 4/2007 |
| JP | 2008-193407 | 8/2008 |
| JP | 2009-516436 | 4/2009 |
| JP | 2009-253359 | 10/2009 |
| JP | 2010-093387 | 4/2010 |
| JP | 2010-288276 | 12/2010 |
| JP | 2012-129805 | 7/2012 |
| JP | 2012-249166 | 12/2012 |

OTHER PUBLICATIONS

TWOA—Office Action of Taiwanese—R.O.C Patent Application No. 103116501 dated Apr. 25, 2016, with partial English translation of the Office Action.
JPOA—Office Action of Japanese Patent Application No. 2017-061587 dated Jan. 23, 2018, with full machine translation of the Office Action.

* cited by examiner

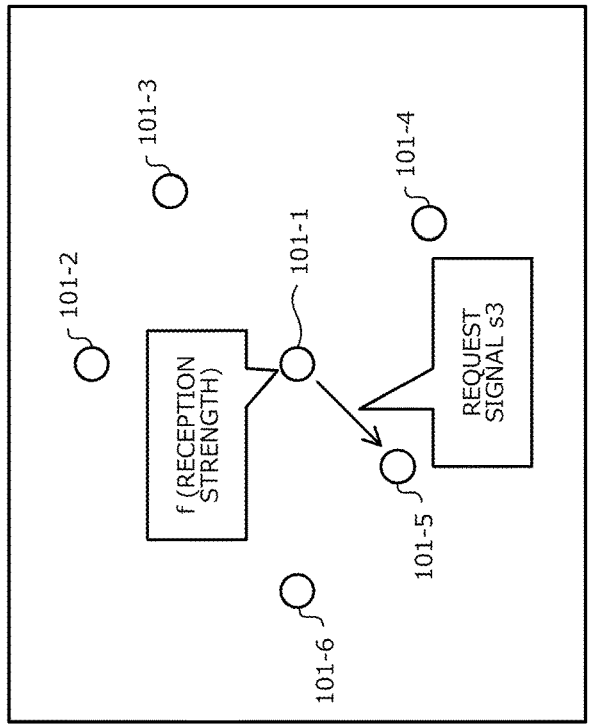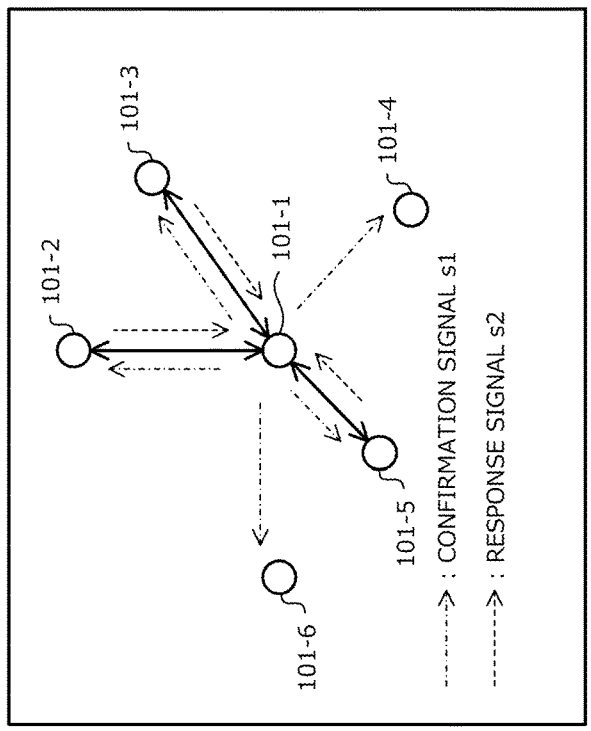
FIG.1

FIG.5

| PARAMETER | DESCRIPTION |
|---|---|
| C [F] | BATTERY CAPACITY |
| V [V] | VOLTAGE |
| R [W/Byte] | AMOUNT OF POWER CONSUMED PER UNIT DATA FOR RECEPTION |
| T [W/Byte/m] | AMOUNT OF POWER CONSUMED TO TRANSMIT UNIT DATA AMOUNT BY STRENGTH ENABLING RECEPTION BY COMMUNICATIONS NODES DISPOSED WITHIN 1 METER |
| E [W] | AMOUNT OF POWER CONSUMED FOR DATA PROCESSING PER UNIT PROCESSING AMOUNT |
| da [Byte] | DATA VOLUME |
| di [m] | COMMUNICATION DISTANCE |
| i | PER UNIT PROCESSING AMOUNT |
| I | OVERALL PROCESSING AMOUNT |
| S [m$^2$] | AREA OF ARRANGEMENT AREA OF COMMUNICATIONS NODES |
| Density [NODES/m$^2$] | ARRANGEMENT DENSITY |

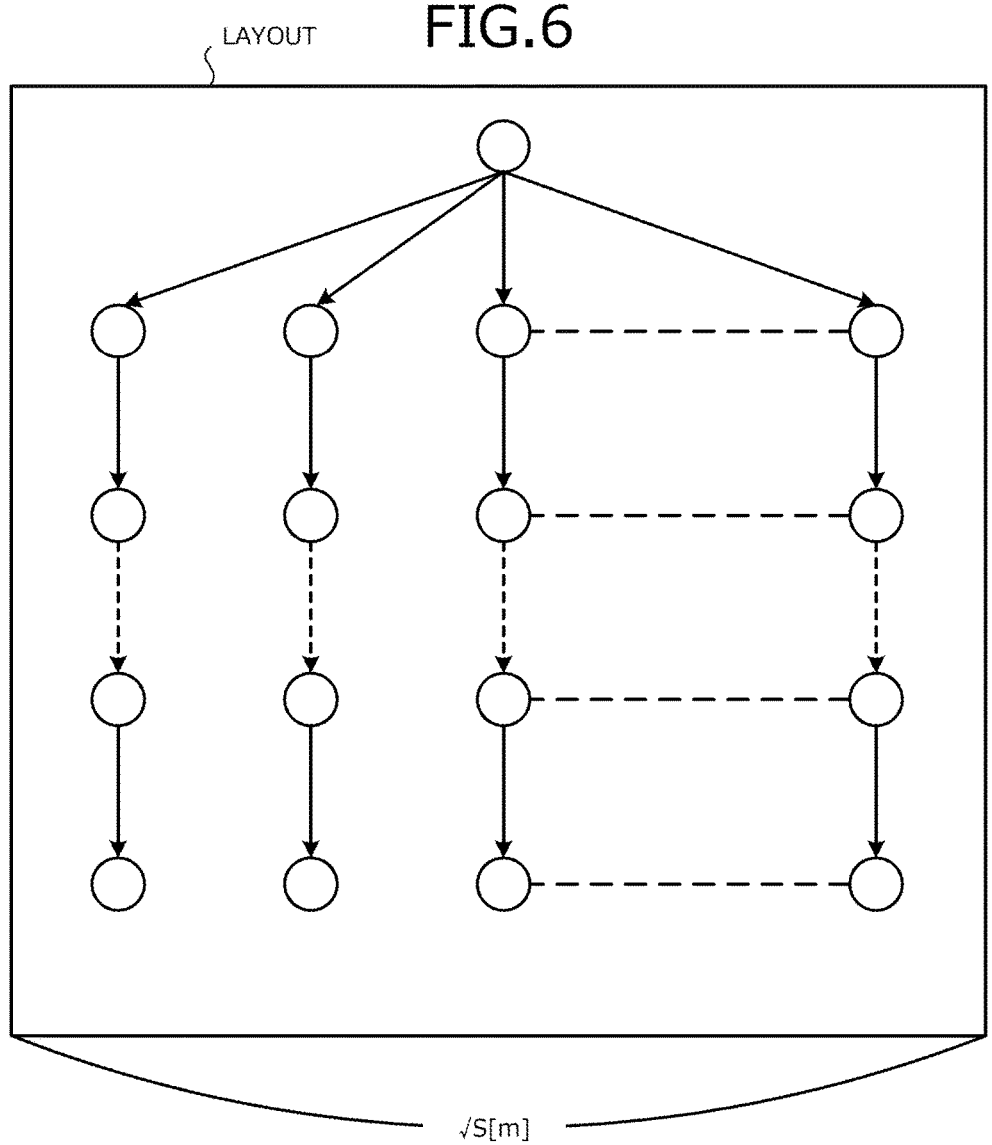

FIG.8

<NEARBY-NODE CONFIRMATION SIGNAL s1>

| SIGNAL ID=0 | SENDER NODE ID | RESERVED |
|---|---|---|

<RESPONSE SIGNAL s2 FOR NEARBY-NODE CONFIRMATION SIGNAL s1>

| SIGNAL ID=1 | SENDER NODE ID | RECEIVER NODE ID | RESERVED |
|---|---|---|---|

<PARALLEL DEPLOYMENT PROCESSING REQUEST SIGNAL s3>

| SIGNAL ID=2 | SENDER NODE ID | RECEIVER NODE ID | NECESSARY NUMBER OF HOPPING | RAW DATA |
|---|---|---|---|---|

<NEARBY-NODE PROCESSING REQUEST CONFIRMATION SIGNAL s4>

| SIGNAL ID=3 | SENDER NODE ID | RECEIVER NODE ID | RESERVED |
|---|---|---|---|

<RESPONSE SIGNAL s5 FOR NEARBY-NODE PROCESSING REQUEST CONFIRMATION SIGNAL s4>

| SIGNAL ID=4 | SENDER NODE ID | RECEIVER NODE ID | RESERVED |
|---|---|---|---|

<PROCESSING HANDOVER REQUEST SIGNAL s6>

| SIGNAL ID=5 | SENDER NODE ID | RECEIVER NODE ID | NECESSARY NUMBER OF HOPPING | HOPPING COUNTER | RAW DATA |
|---|---|---|---|---|---|

◯ : OPERATING COMMUNICATIONS NODES

⇢ : s1

◉ : FAILED COMMUNICATIONS NODES, COMMUNICATIONS NODES HAVING UNCHARGED BATTERIES

○ : OPERATING COMMUNICATIONS NODES  → : s6

◉ : FAILED COMMUNICATIONS NODES, COMMUNICATIONS NODES HAVING UNCHARGED BATTERIES

◉ : NODES CAPABLE OF PARALLEL DEPLOYMENT

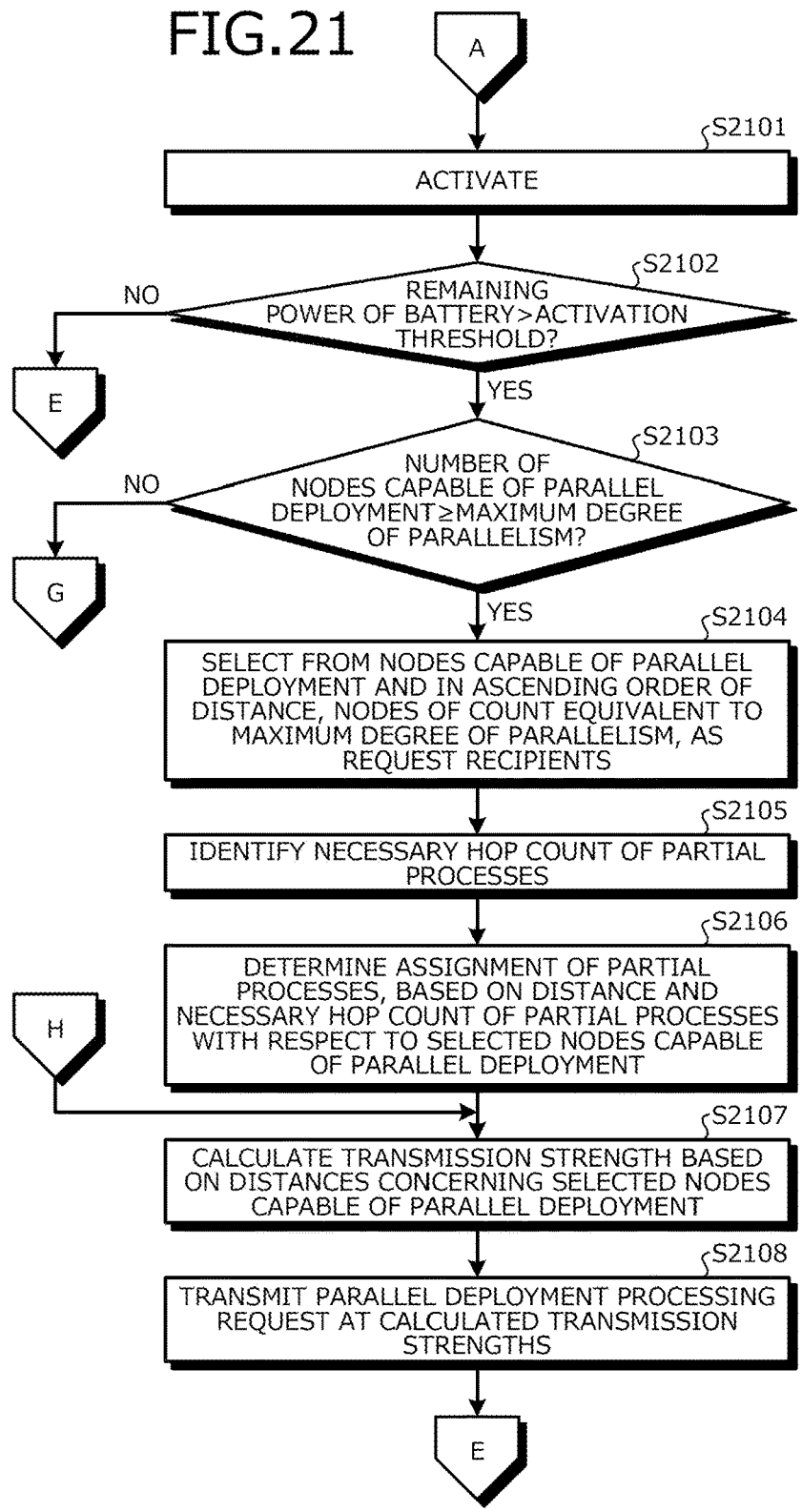

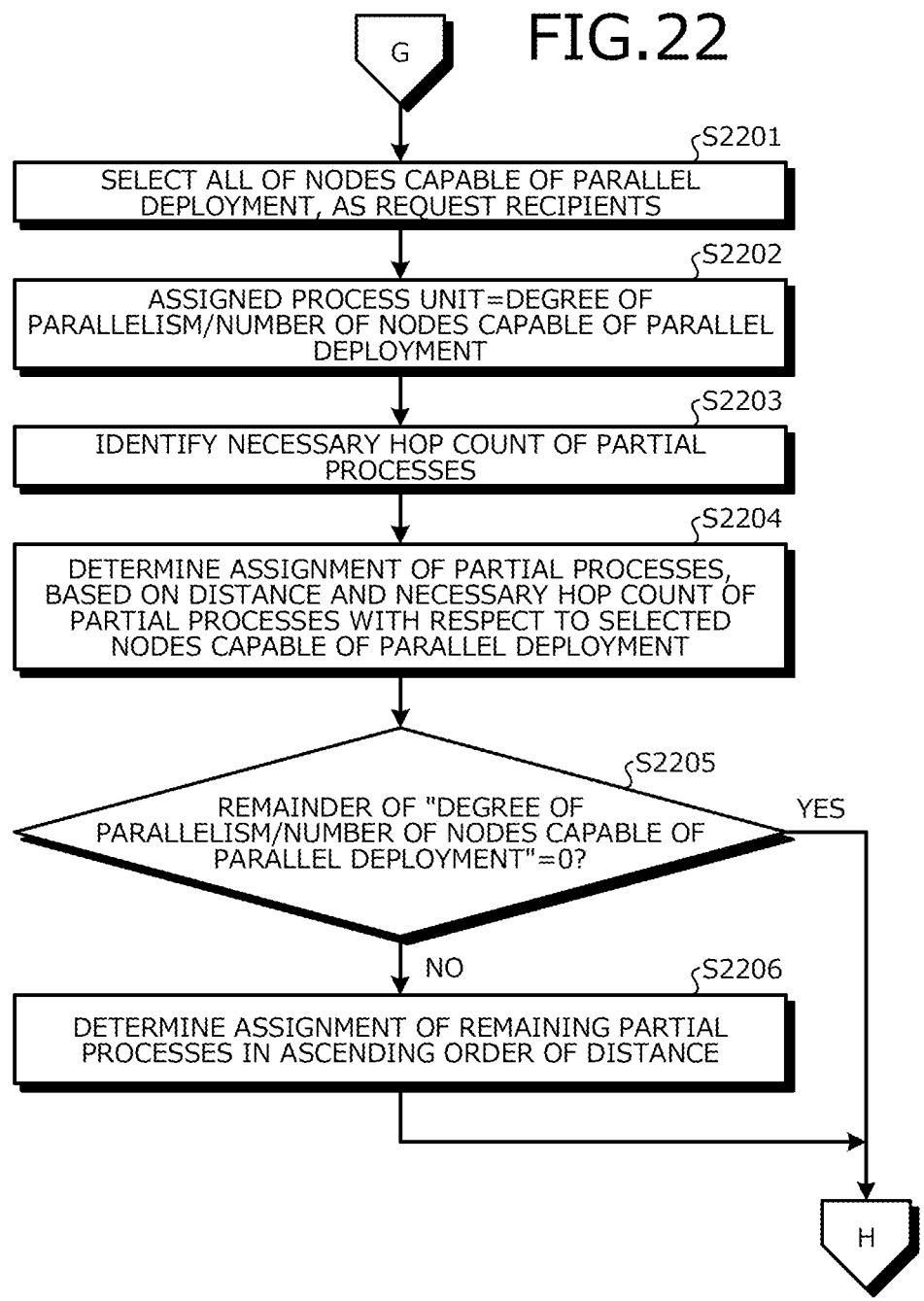

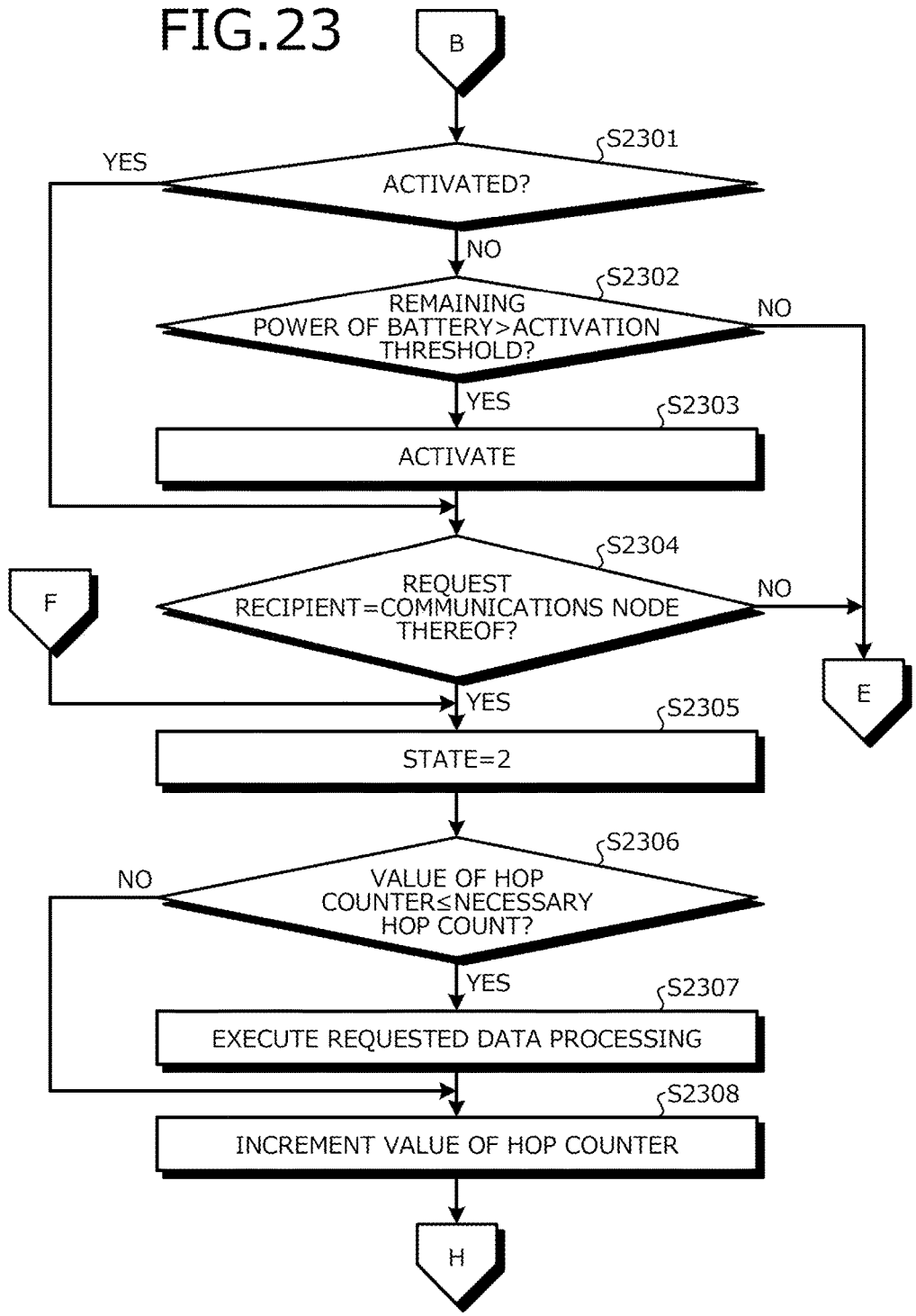

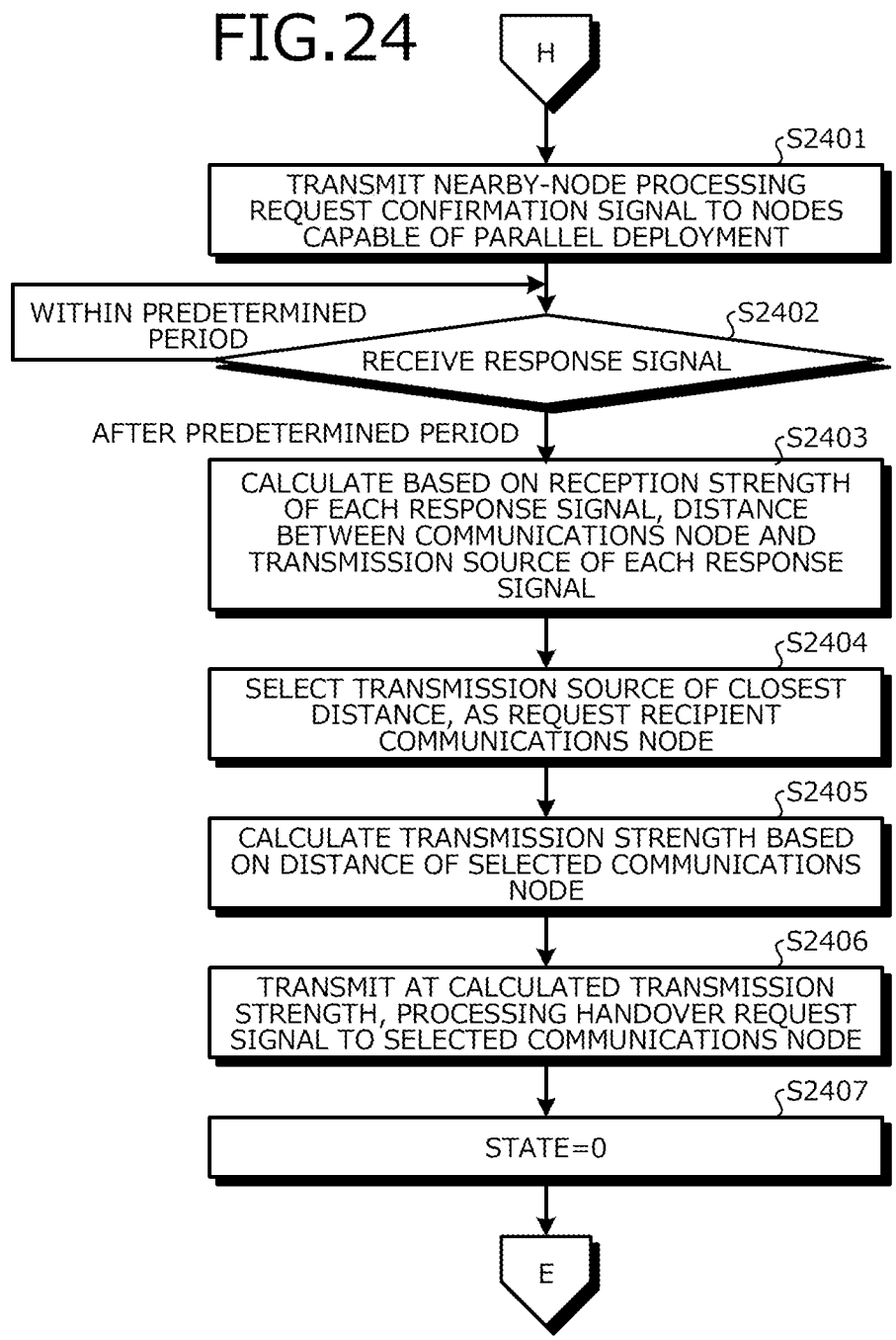

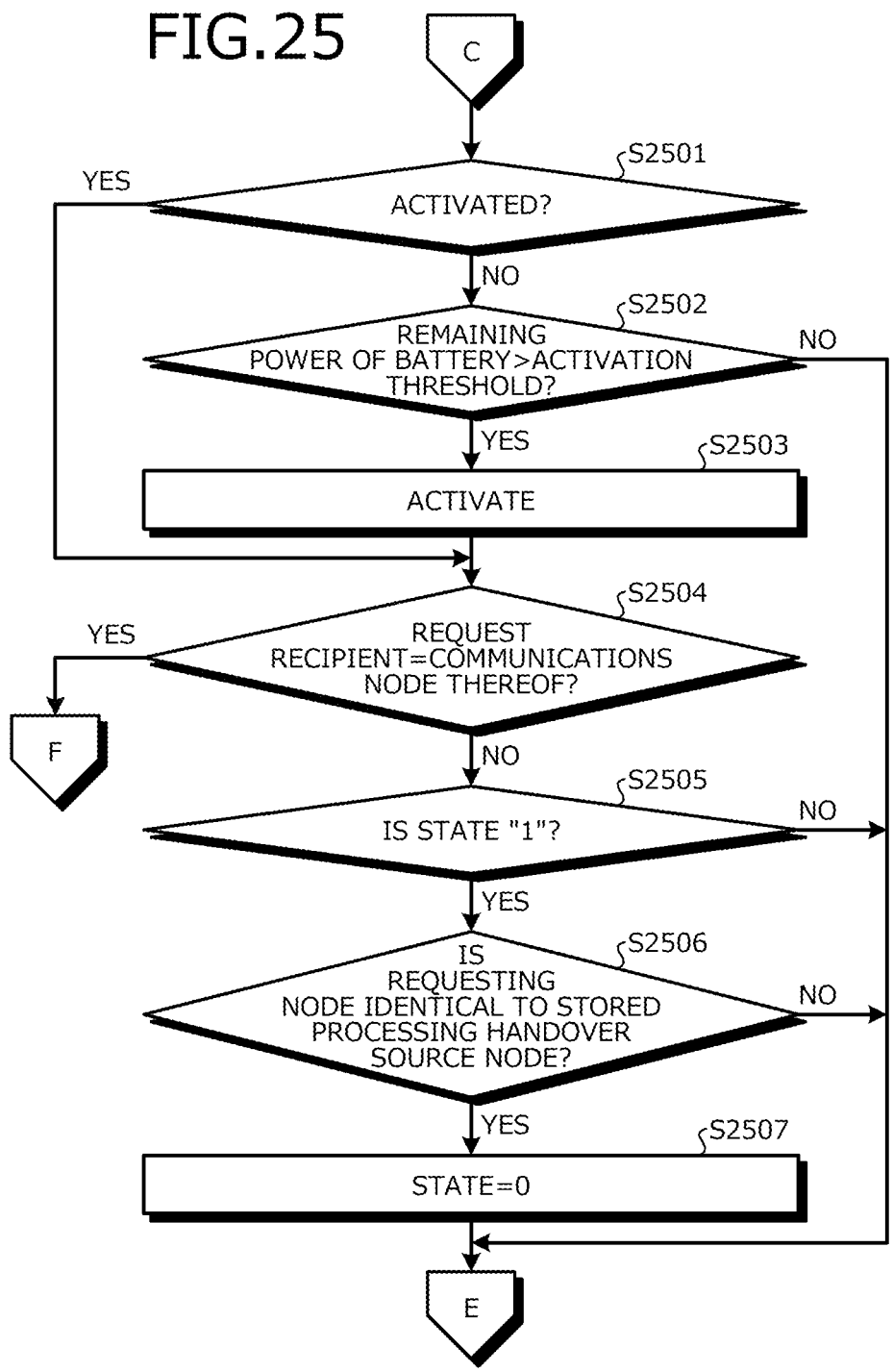

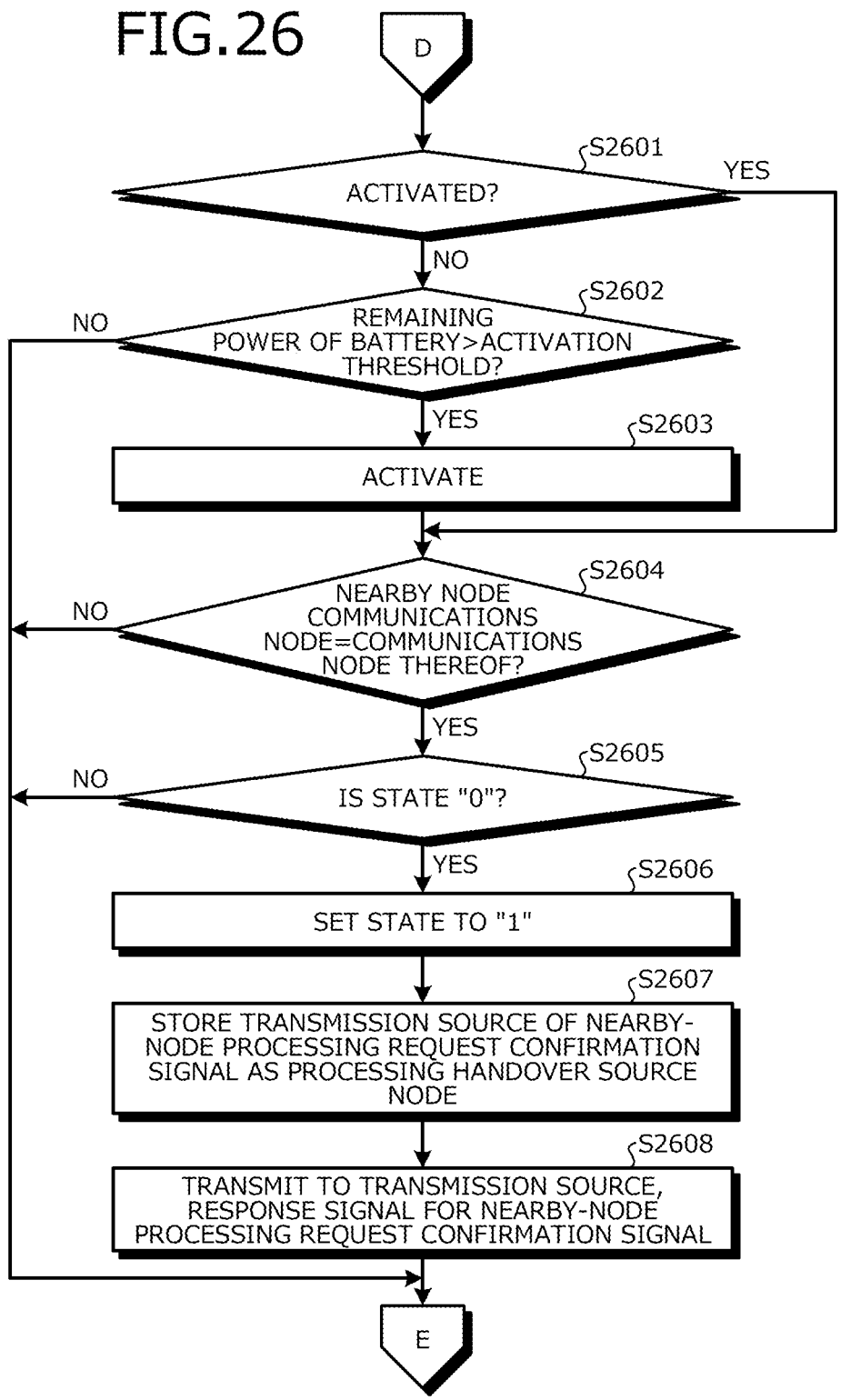

US 10,178,629 B2

COMMUNICATIONS NODE, SYSTEM, COMMUNICATIONS METHOD, AND COMPUTER PRODUCT

CROSS REFERENCE TO RELATED APPLICATIONS

This application is a continuation application of International Application PCT/JP2013/064292, filed on May 22, 2013 and designating the U.S., the entire contents of which are incorporated herein by reference.

FIELD

The embodiments discussed herein are related to a communications node, a system, a communications method, and a computer product.

BACKGROUND

According to a conventional technique, a wireless network is formed by communications nodes that are connected by wireless communication using a wireless communications means (for example, refer to Japanese Laid-Open Patent Publication No. 2010-288276). Further, to perform communication between two distant communications nodes in a wireless network, relayed multihop communication through other communications nodes is performed (for example, refer to Japanese Laid-Open Patent Publication No. 2008-193407). In such a wireless network, wireless connection relations between communications nodes change frequently.

Nonetheless, when a communications node wirelessly transmits a request signal requesting data processing to another communications node, a problem arises in that a large amount of power is consumed for the wireless transmission if the data volume of the request signal is large.

SUMMARY

According to an aspect of an embodiment, a communications node includes a first transmitting circuit configured to transmit to plural communications nodes, a confirmation signal for confirming whether response is possible; a receiving circuit configured to receive from first communications nodes capable of responding among the plural communications nodes, a response signal for the confirmation signal transmitted by the first transmitting circuit; a selecting circuit configured to select from among the first communications nodes and based on reception strength of the response signal received by the receiving circuit, a second communications node to which execution of data processing is requested by the communications node; a strength calculating circuit configured to calculate based on the reception strength of the response signal from the second communications node selected by the selecting circuit, a transmission strength to the second communications node; and a second transmitting circuit configured to transmit to the second communications node and based on the transmission strength calculated by the calculating circuit, a request signal requesting execution of the data processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram depicting an example of operation performed by a communications node;

FIG. 5 is a table depicting an example of parameters;

FIG. 6 is a diagram depicting an example of an area of an arrangement area;

FIG. 8 is a diagram depicting an example of packet format;

FIGS. 20, 21, 22, 23, 24, 25, and 26 are flowcharts of an example of a procedure of a communications process of the communications node.

DESCRIPTION OF EMBODIMENTS

Figure 2:
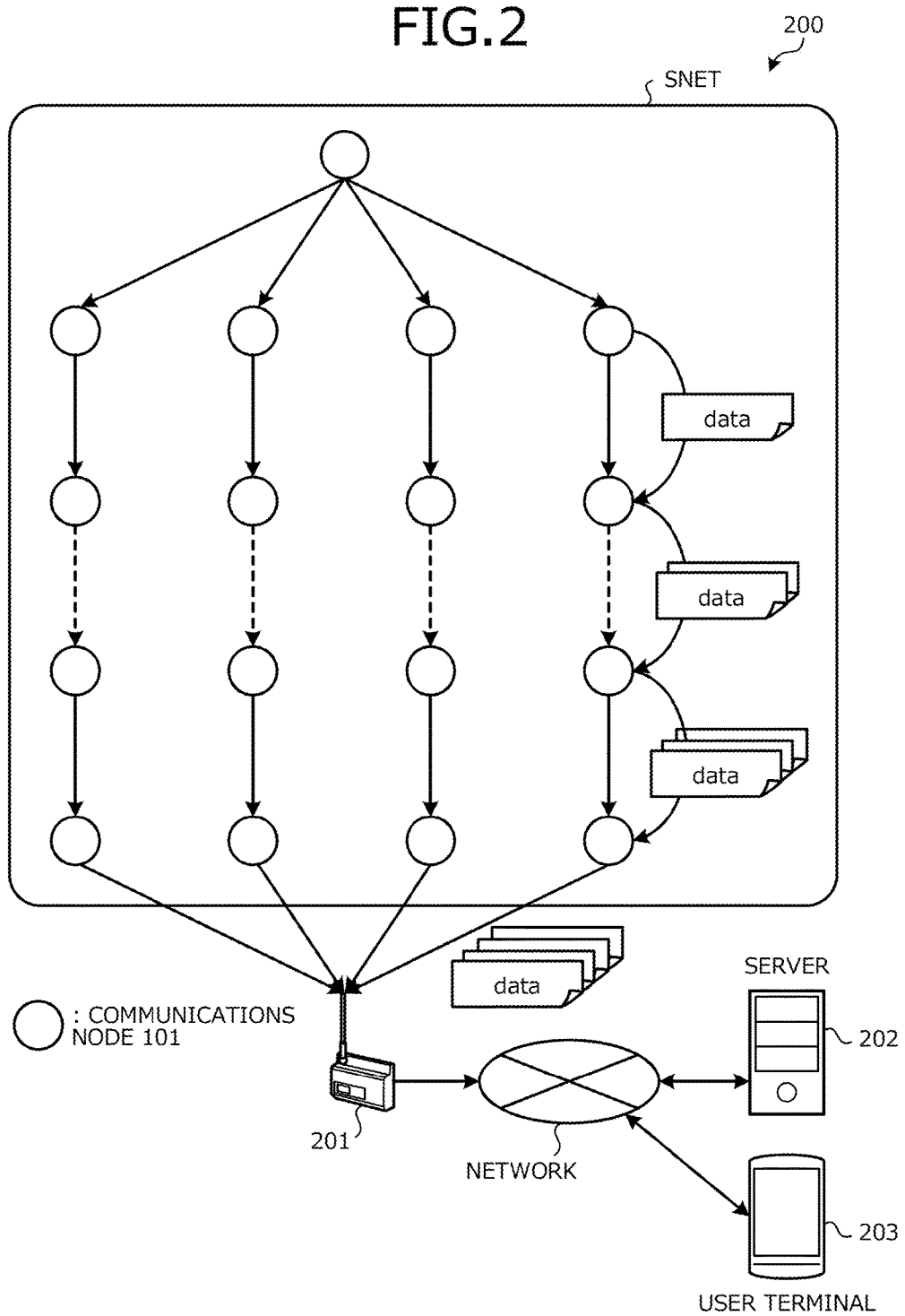
FIG. 2 is a diagram depicting an example of a system.

Embodiments of a communications node, a system, a communications method, and a communications program according to the present disclosure will be described in detail with reference to the accompanying drawings.

FIG. 1 is a diagram depicting an example of operation performed by a communications node. Plural communications nodes 101 are disposed in a given area. The given area, for example, is an area filled with a substance such as concrete, soil, water, air, etc. Each of the communications nodes 101 is equipped with a harvester and a battery, and stores power generated by the harvester to the battery. For example, a communications node 101-1 transmits to the plural communications nodes 101, a confirmation signal s1 to confirm whether response is possible. Here, the communications node 101-1 transmits the confirmation signal by a constant power. Therefore, the confirmation signal s1 does not reach communications nodes 101 that are farther than the distance determined by the constant power. For example, communications nodes 101-2 to 101-6 are at positions that cannot be reached by the confirmation signal s1 from the communications node 101-1.

The communications node 101-1 receives in response to the transmitted confirmation signal s1, response signals s2 from first communications nodes 101 that are capable of responding among the plural communications nodes 101. Here, the first communications nodes 101 include communications nodes 101-2, 101-3, and 101-5. Communications nodes 101 that have failed, communications nodes 101 that have insufficient power remaining in the battery, etc. are unable to respond to the confirmation signal s1 and therefore, do not transmit a response signal s2. Insufficient power remaining in the battery, for example, represents a case where the remaining amount of power is not enough to receive a request signal s3 described hereinafter and/or to execute data processing requested by the request signal s3.

The communications node 101-1 selects from among the first communications nodes 101 and based on the reception strength of the received response signal s2, a second communications node 101 to which execution of data processing is to be requested by the communications node 101-1. Here, the reception strength represents the strength of the received signal. The reception strength, for example, is a Received Signal Strength Indicator (RSSI), reception power [dBm], etc. The reception strength, for example, may be obtained from the antenna. For example, when the transmission strength of the response signals s2 is the same, the greater the reception strength loss is for a communications node 101, the farther the distance is from the communications node 101-1; and the smaller the reception strength loss is for a communications node 101, the closer the distance is from the communications node 101-1. Therefore, the transmission strength can be reduced when data processing is requested to a communications node 101 for which the reception strength loss is small. Thus, for example, the communications node 101-1 selects the communications node 101 for which the reception strength loss is the smallest. In this example, the communications node 101-1 selects the communications node 101-5 as the second communications node 101.

The communications node 101-1 calculates based on the reception strength of the response signal s2 from the selected second communications node 101, a transmission strength to the second communications node 101. Here, the transmission strength represents the strength of a signal to be transmitted. More specifically, the communications node 101-1, upon providing the reception strength of the response signal s2, calculates the transmission strength based on a function that obtains a transmission strength that enables the request signal s3 to reach the transmission source of the response signal s2, from the communications node 101-1. The request signal s3 is a signal that requests execution of data processing. Further, for example, the function, upon being provided the reception strength of the response signal s2, obtains the smallest transmission strength among transmission strengths enabling the request signal s3 to reach the transmission source of the response signal s2, from the communications node 101-1. The function is prestored to a storage apparatus in the communications nodes 101 and is a composite function of first to fourth functions described hereinafter.

Alternatively, the communications node 101-1 obtains the reception strength of the response signal s2 from a table correlating reception strengths of the response signal s2 and transmission strengths that enable a request signal s3 to reach the transmission source of the response signal s2, from the communications node 101-1. Thus, the communications node 101-1 may calculate the transmission strength to the second communications node 101. Further, for example, the table may be created such that the smallest transmission strength is obtained among transmission strengthens enabling the request signal s3 to reach the transmission source of the response signal s2, from the communications node 101-1. For example, the table is prestored to a storage apparatus in the communications nodes 101. The communications node 101-1 transmits the request signal s3 to the second communications node 101 at the calculated transmission strength.

As a result, the request signal can be transmitted by a small amount of power to a communications node estimated to be closer than others. Therefore, a suitable communications counterpart can be caused to execute data processing and the power consumed for wireless transmission can be reduced.

FIG. 2 is a diagram depicting an example of the system. A system 200, for example, is a sensor network system having a sensor network SNET, a communications apparatus 201, PCs, etc.

The sensor network SNET includes the plural communications nodes 101. The plural communications nodes 101 are wireless communications terminals and disposed in the given area described above. A few hundred to a few tens of thousands of the communications nodes 101 are assumed to be disposed in a given area. Since the communications nodes 101 are installed over a wide range, not all of the communications nodes 101 can directly communicate data with the communications apparatus 201. Thus, in the system 200, processing results of data processing for sensing results reach the communications apparatus 201 by multihop communication through other communications nodes 101.

Further, in the present embodiment, the data processing is assumed to be data processing that can be divided into plural partial processes that can be performed in parallel. Therefore, in the present embodiment, data processing for a sensing event is distributed among the plural communications nodes 101 and performed in parallel; and the processing results of the data processing are transferred to the communications apparatus 201 by multihop communication among the plural communications nodes 101. The communications apparatus 201 aggregates the processing results of at least a portion of the data processing of the plural communications nodes 101. A server 202, a user terminal 203, etc., for example, receive aggregation results from the communications apparatus 201 and instruct the communications apparatus 201, etc.

Figure 3:
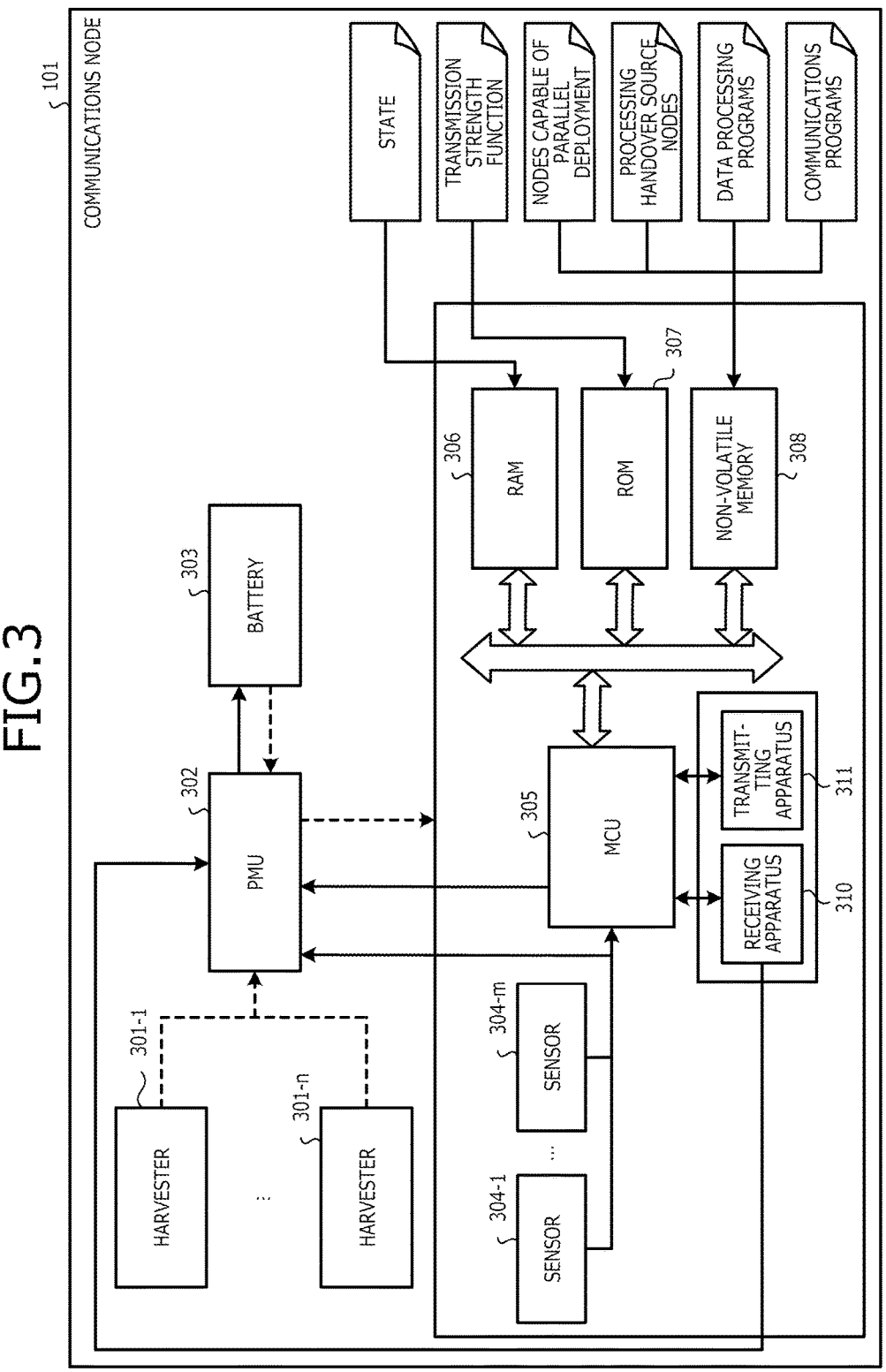
FIG. 3 is a diagram depicting hardware configuration of the communications node.

FIG. 3 is a diagram depicting hardware configuration of a communications node. The communications node 101 has plural harvesters 301-1 to 301-$n$, a power management unit (PMU 302), a battery 303, plural sensors 304-1 to 304-$m$, a micro control unit (MCU 305, random access memory (RAM) 306, read-only memory (ROM) 307, a non-volatile memory 308, a receiving apparatus 310, and a transmitting apparatus 311.

The sensors 304 detect a given change at the installation site. The sensors 304, for example, may be a piezoelectric element that detects voltage at the installation site, an element that detects temperature, a photoelectric element that detects light, and the like.

The receiving apparatus 310 and the transmitting apparatus 311 have an antenna and a wireless communications circuit (radio frequency (RF)). The receiving apparatus 310 is a receiving unit that receives radio waves as reception signals by the antenna. The transmitting apparatus 311 is a transmitting unit that transmits radio waves as transmission signals through the antenna. The transmitting apparatus 311, for example, is assumed to be configured to adjust the transmission strength under the control of the MCU 305.

The MCU 305 requests nearby communications nodes 101 to execute data processing for sensing results obtained by the sensor 304. The RAM 306 stores transient data of the processing at the MCU 305. For example, states are stored in the RAM 306. A state is information for managing request states of the data processing. A state of "0" indicates that transfer of processing results, execution of data processing, etc. has not be requested by any communications node 101. A state of "1" indicates that a response signal has been transmitted for a nearby-node processing request confirmation signal described hereinafter. A state "2" indicates that execution of data processing or transfer of processing results by a processing handover request signal or a parallel deployment processing request signal described hereinafter has been requested.

The ROM 307 stores processing programs executed by the MCU 305, the first function to the fourth function described hereinafter, etc. A composite function of the first function and the second function, for example, is a function capable of calculating the distance between communications nodes 101 based on reception strength; and a composite function of the third function and the fourth function is a function capable of calculating transmission strength based on the distance between communications nodes 101.

The non-volatile memory 308 is writable memory and retains given data written thereto, even when power supply ceases. For example, the writable non-volatile memory 308 is flash memory. The non-volatile memory 308, for example, may store information indicating nodes capable of parallel deployment, information indicating processing handover source nodes, data processing programs, communications programs, etc.

The harvester 301 generates power based on the external environment at the installation site of the communications node 101 thereof, such as, for example, energy changes in light, vibration, temperature, wireless radio waves (reception radio waves), etc. The harvester 301 may be provided in plural. The harvester 301 may generate power according to the amount of change detected by the sensor 304. The battery 303 is a power storing unit that stores the power generated by the harvester 301. In other words, communications node 101 does not require a secondary battery or an external power source and internally generates the power for operating components of the communications node 101.

The PMU 302 controls as a driving source, supply of the power stored by the battery 303, to the components of the communications node 101. Further, the PMU 302 detects the occurrence of an event such as a reception event of a signal by the receiving apparatus 310, a sensing event by the sensors 304, an activation event by a timer, etc. The PMU 302, upon detection of various types of events, controls the activation of the MCU 305. For example, when the remaining power of the battery 303 is less than the amount of power necessary for activating the MCU 305, the PMU 302 does not activate the MCU 305; and when the remaining power of the battery 303 exceeds the amount of power necessary for activating the MCU 305, the PMU 302 activates the MCU 305.

Figure 4:
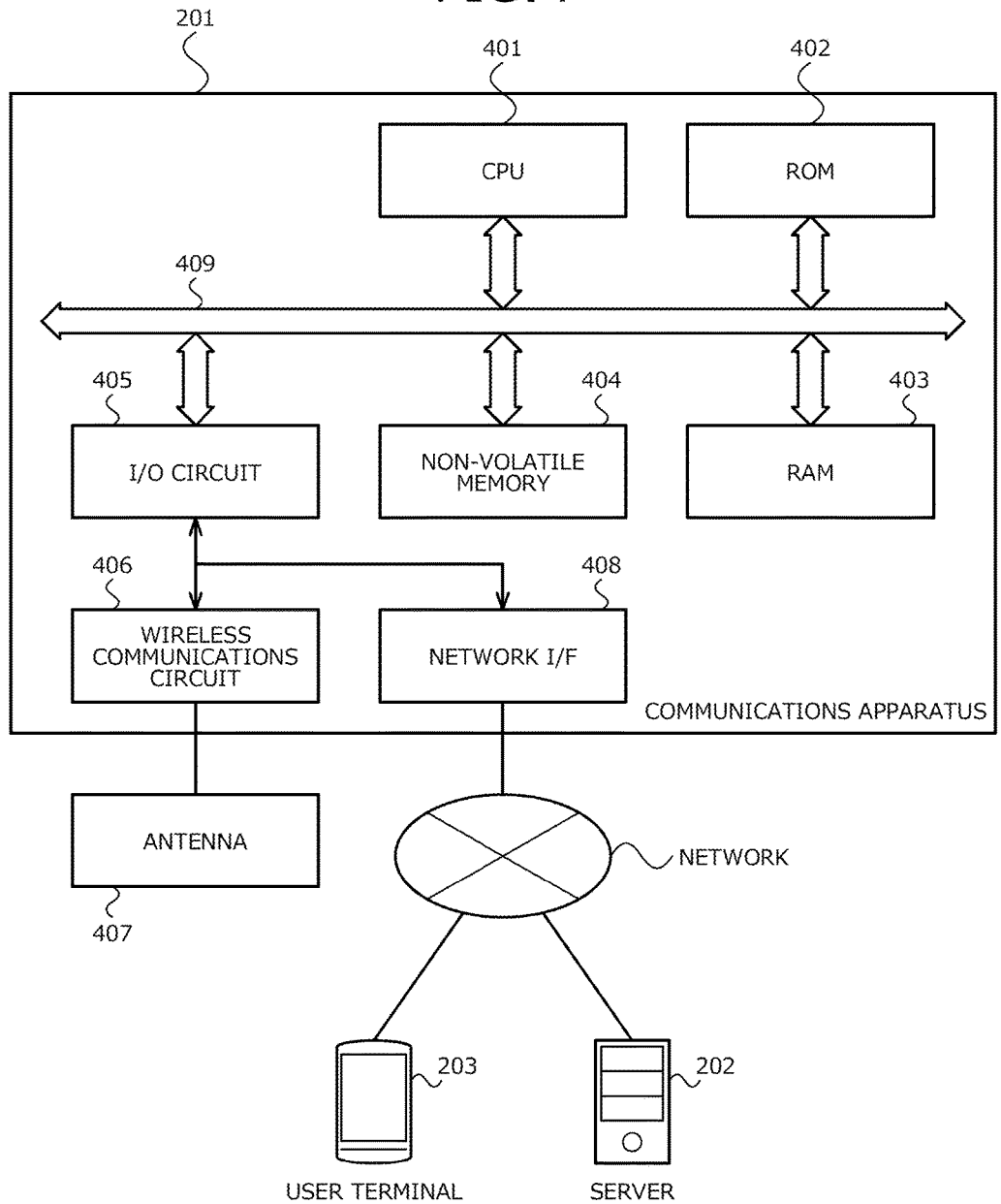
FIG. 4 is a diagram depicting hardware configuration of a communications apparatus.

FIG. 4 is a diagram depicting hardware configuration of the communications apparatus. The communications apparatus 201, unlike the communications nodes 101, operates based on an external power source. The communications apparatus 201 has a central processing unit (CPU) 401, which is more sophisticated than the MCU 305 of the communications node 101, large capacity the ROM 402, RAM 403 and non-volatile memory 404, and an input/output (I/O) circuit 405 serving as an interface. The communications apparatus 201 further has a bus 409 that connects the CPU 401, the ROM 402, the RAM 403, the non-volatile memory 404, and the I/O circuit 405.

Here, the CPU 401 governs overall control of the communications apparatus 201. The CPU 401 executes various programs stored in a storage apparatus such as the ROM 402, the RAM 403, the non-volatile memory 404, etc., whereby data in the storage apparatus is read out, data that are execution results are stored to the storage apparatus, etc.

Further, the I/O circuit 405 is connected to a wireless communications circuit (RF) 406, an antenna 407, and a network I/F 408, whereby the communications apparatus 201 is able to wirelessly communicate with communications nodes 101 through the wireless communications circuit 406 and the antenna 407. The communications apparatus 201 can communicate with external apparatuses such as the server 202 and the user terminal 203, by TCP/IP protocol processes, etc. through the network I/F 408, and a network NET such as the Internet, etc. Further, although not depicted, the communications apparatus 201 may further include an input apparatus and output apparatus such as a display, a keyboard, a touch panel display, etc.

The setting of the communication distance and the number of communications nodes 101 to be disposed is performed based on specifications of the communications nodes 101 and program specifications. More specifically, although the communications apparatus 201 or the user terminal 203 can perform the setting, in the present example, the setting is assumed to be performed by the communications apparatus 201. Examples of parameters used in calculating the communication distance and the number of communications nodes 101 to be disposed, and the area of an arrangement area will be described with reference to FIGS. 5 and 6, respectively.

FIG. 5 is a table depicting an example of parameters. FIG. 6 is a diagram depicting an example of the area of an arrangement area. C represents the battery capacity; V represents voltage; and R represents the amount of power consumed per unit data for reception. T represents the amount of power consumed to transmit a unit data amount by a strength enabling communications nodes disposed within 1 meter, for example, to receive the data. E represents the amount of power consumed for data processing per unit processing amount. da represents the data volume; and di represents the communication distance. i represents the unit processing amount; and I represents the overall processing amount. S represents the area of an arrangement area of the communications nodes 101, in FIG. 6. Density represents a count of the communications nodes 101 ("arrangement density") [nodes/m$^2$] per 1 square meter for performing multihop communication, etc.

A maximum receivable data count when the communications node 101 receives data of a constant size is expressed by equation (1).

$$\text{maximum receivable data count} = \frac{1}{2}CV^2 \frac{1}{R \times da} \quad (1)$$

Volume processable by 1 communications node 101 is expressed by equation (2).

$$processing\,volume = \frac{\left(\frac{1}{2}CV^2 - T \times da \times di - R \times da\right) \times i}{E} \quad (2)$$

A count of the communications nodes 101 necessary for execution of data processing is expressed by equation (3).

$$communications\,node\,count = \frac{I \times E}{\left(\frac{1}{2}CV^2 - T \times da \times di - R \times da\right) \times i} \quad (3)$$

A hop count between communications nodes 101 for partial processes of the data processing is expressed by equation (4).

$$hop\,count = \frac{I \times E}{\left(\frac{1}{2}CV^2 - T \times da \times di - R \times da\right) \times i} \times \frac{2R}{CV^2} \quad (4)$$

Arrangement density is expressed by equation (5). The arrangement density in equation (5) is abbreviated and written herein as the arrangement density D.

$$arrangement\,density\,D = \frac{\frac{I \times E}{\left(\frac{1}{2}CV^2 - T \times da \times di - R \times da\right) \times i}}{S}$$

$$= \frac{I \times E \times S}{\left(\frac{1}{2}CV^2 - T \times da \times di - R \times da\right) \times i} \quad (5)$$

The distance di defining the interval at which the communications nodes 101 are disposed is expressed by equation (6).

$$communication\,distance\,di = \frac{\sqrt{S}}{\frac{I \times E}{\left(\frac{1}{2}CV^2 - T \times da \times di - R \times da\right) \times i} \times \frac{2R}{CV^2}}$$

$$= \frac{\left(\frac{1}{2}CV^2 - T \times da \times di - R \times da\right) \times i \times CV^2 \times \sqrt{S}}{2I \times E \times R} \quad (6)$$

The plural communications nodes 101 are disposed based on calculation results of equations (1) to (6).

Figure 7:
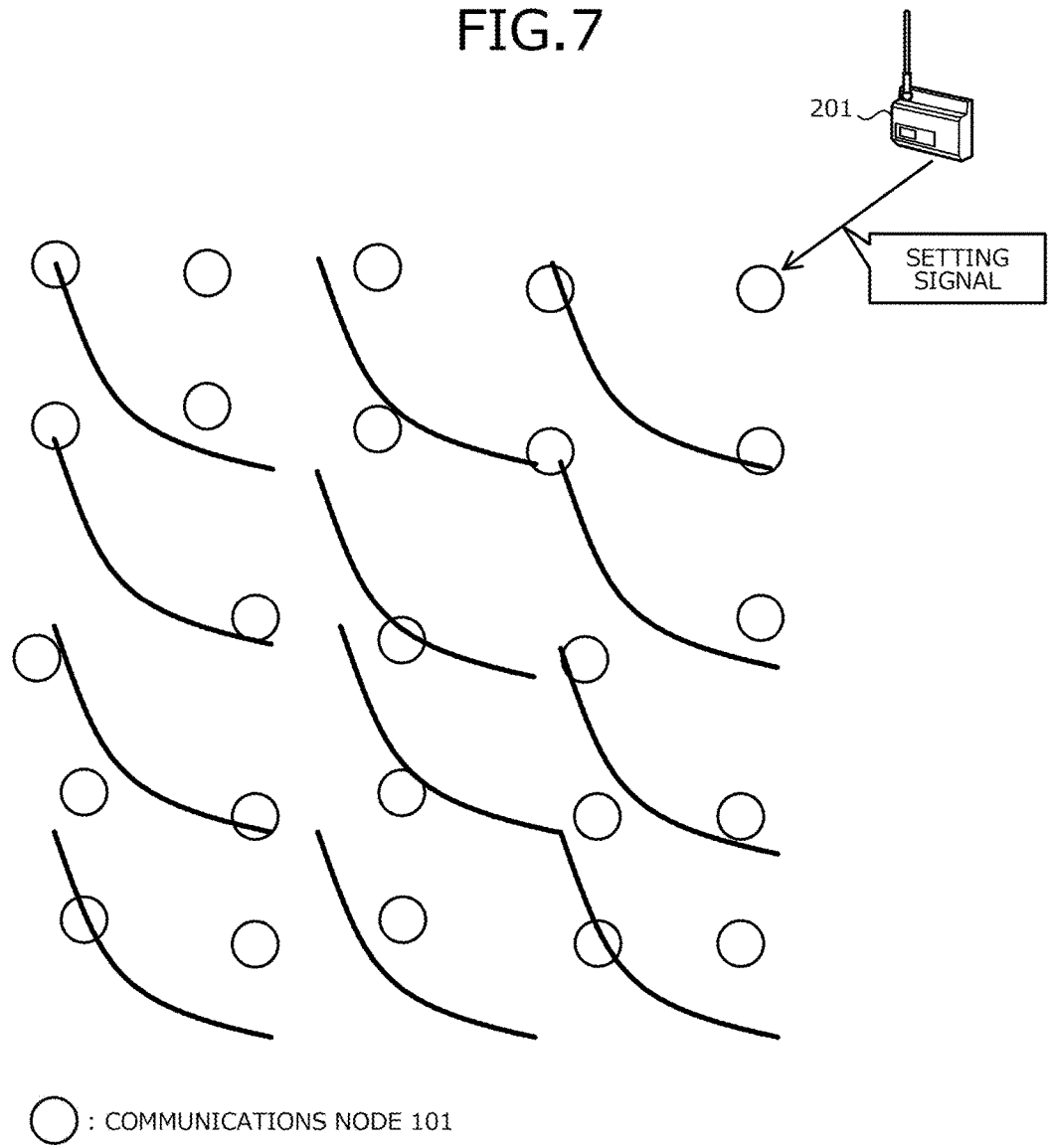
FIG. 7 is a diagram depicting an example of a communication distance set between communications nodes before operation.

FIG. 7 is a diagram depicting an example of the communication distance set between communications nodes before operation. The communications apparatus 201 transmits to the communications nodes 101 in the system 200, a setting signal for the communication distance. The setting signal may be propagated by multihop communication among the communications nodes 101, transmitted to the communications nodes 101 overall by the communications apparatus 201, etc. The setting signal includes a transmission strength based on the communication distance.

The communications nodes 101 receive the setting signal. The communications nodes 101 activate the MCU 305. The communications nodes 101 store under the control of the MCU 305, the transmission strength included in the setting signal to a storage apparatus such as the RAM 306 and the non-volatile memory 308. The communications nodes 101, using the transmitting apparatus 311 under the control of the MCU 305, transmit a signal by the transmission strength included in the setting signal. The communications nodes 101 transmit by the transmission strength included in the setting signal, a nearby-node confirmation signal, a response signal for a nearby-node confirmation signal, a nearby-node processing request confirmation signal, and response signal for a nearby-node processing request confirmation signal. Further, when transmitting a parallel deployment processing request signal and a processing handover request signal, the communications nodes 101 perform transmission by the reception strength of the received response signal.

FIG. 8 is a diagram depicting an example of packet format. In the present embodiment, signals transmitted by the communications nodes 101 include a nearby-node confirmation signal s1, a response signal s2 to a nearby-node confirmation signal s1, and a parallel deployment processing request signal s3. Signals transmitted by the communications nodes 101 further include a nearby-node processing request confirmation signal s4, a response signal s5 for a nearby-node processing request confirmation signal s4, and a processing handover request signal s6. Packet formats of the signals will be described.

A nearby-node confirmation signal s1 is a signal for confirming whether response is possible among the plural communications nodes 101 capable of direct wireless communication with the transmission source of the nearby-node confirmation signal s1. More specifically, a nearby-node confirmation signal s1 includes a signal ID, a sender node ID, and a reserved area. The signal ID of the nearby-node confirmation signal s1 is assumed to be "0". The sender ID of the nearby-node confirmation signal s1 is identifier information indicating the transmission source of the nearby-node confirmation signal s1. Identifier information of the communications nodes 101 is assumed to be preassigned to the communications nodes 101 before operation. The serial number at the time of manufacture, for example, may be used as the identifier information of the communications nodes 101. The reserved area of the nearby-node confirmation signal s1 is an auxiliary area. Further, since the communications nodes 101 transmit the nearby-node confirmation signal s1 without specifying a destination, the nearby-node confirmation signal s1 does not have identifier information indicating the destination.

A response signal s2 for a nearby-node confirmation signal s1 is a signal transmitted when response is possible. The response signal s2 for a nearby-node confirmation signal s1 includes a signal ID, a sender node ID, a receiver node ID, and a reserved area. The signal ID of the response signal s2 for a nearby-node confirmation signal s1 is assumed to be "1". The sender node ID of the response signal s2 is identifier information indicating the transmission source of the response signal s2. The receiver node ID of the response signal s2 is identifier information indicating the transmission source of the nearby-node confirmation signal s1 and the transmission destination of the response signal s2. The reserved area of the response signal s2 is an auxiliary area.

A parallel deployment processing request signal s3 is a signal for requesting to other communications nodes 101, data processing that can be divided into a predetermined number of partial processes to be processed in parallel. The predetermined number of partial processes is assumed to be defined as a predetermined degree of parallelism, by a designer of programs concerning the data processing. The parallel deployment processing request signal s3 includes a signal ID, a sender node ID, a receiver node ID, a necessary number of hopping, and raw data. The signal ID of the parallel deployment processing request signal s3 is assumed to be "2". The sender node ID of the parallel deployment processing request signal s3 is identifier information of the transmission source of the parallel deployment processing request signal s3. The receiver node ID of the parallel deployment processing request signal s3 is identifier information of the request recipient of a partial process.

The necessary number of hopping of the parallel deployment processing request signal s3 is a count of communications nodes necessary to complete execution of the partial processes. The necessary number of hopping is also called "necessary hop count". The necessary hop count is already predetermined at the time of design of data processing concerning the partial processes. Here, the communications nodes 101, when generating a packet of a parallel deployment processing request signal s3, may specify the necessary hop count from data processing that includes the partial processes. Alternatively, the necessary hop count concerning the partial processes may be prestored in a storage apparatus such as the ROM 307 and the non-volatile memory 308, from which the communications nodes obtain the necessary hop count of the partial processes when generating a packet of the parallel deployment processing request signal s3. Raw data of the parallel deployment processing request signal s3 is information related to execution of the partial processes and, for example, may include sensing data obtained by a sensing event and may further include program data itself concerning the partial processes.

A nearby-node processing request confirmation signal s4 is a signal that confirms whether a partial process can be requested to a node capable of parallel deployment. The nearby-node processing request confirmation signal s4 includes a signal ID, a sender node ID, a receiver node ID, and a reserved area. The signal ID of the nearby-node processing request confirmation signal s4 is assumed to be "3". The sender node ID of the nearby-node processing request confirmation signal s4 is identifier information of the transmission source of the nearby-node processing request confirmation signal s4. The receiver node ID of the nearby-node processing request confirmation signal s4 is identifier information of the destination of the nearby-node processing request confirmation signal s4 and the identifier information of a node capable of parallel deployment. The reserved area of the nearby-node processing request confirmation signal s4 is an auxiliary area.

A response signal s5 for a nearby-node processing request confirmation signal s4 is a signal transmitted when response is possible. The response signal s5 of a nearby-node processing request confirmation signal s4 includes a signal ID, a sender node ID, a receiver node ID, and a reserved area. The signal ID of the response signal s5 is assumed to be "4". The sender node ID of the response signal s5 is identifier information of the transmission source of the response signal s5. The receiver node ID of the response signal s5 is identifier information of the destination of the response signal s5 and identifier information of the transmission source of the nearby-node processing request confirmation signal s4. The reserved area of the response signal s5 is an auxiliary area.

A processing handover request signal s6 is a signal requesting partial process handover. The processing handover request signal s6 includes a signal ID, a sender node ID, a receiver node ID, a necessary number of hopping, a hopping counter, and raw data. The signal ID of the processing handover request signal s6 is assumed to be "5". The sender node ID of the processing handover request signal s6 is identifier information of the transmission source of the processing handover request signal s6 and the identifier information of the node requesting the partial process handover. The receiver node ID of the processing handover request signal s6 is the identifier information of the transmission source of the processing handover request signal s6 and is the identifier information of the request recipient of the partial process.

The necessary number of hopping of the processing handover request signal s6 is the number of communications nodes necessary for completing execution of the partial processes. The hopping counter of the processing handover request signal s6 is a count value of the number of communications nodes that executed a partial process, among the number of communications nodes necessary to complete execution of the partial processes. For example, if the count of the necessary number of hopping and the count of the hopping counter coincide, the processing handover request signal s6 is a signal requesting transfer of raw data to the communications apparatus 201. The raw data of the processing handover request signal s6 is information related to execution of the partial processes and, for example, may include sensing data of a sensing event, and may further include program data itself concerning the partial process. The raw data of the processing handover request signal s6 further includes processing results of partial processes that have been executed.

Figure 9:
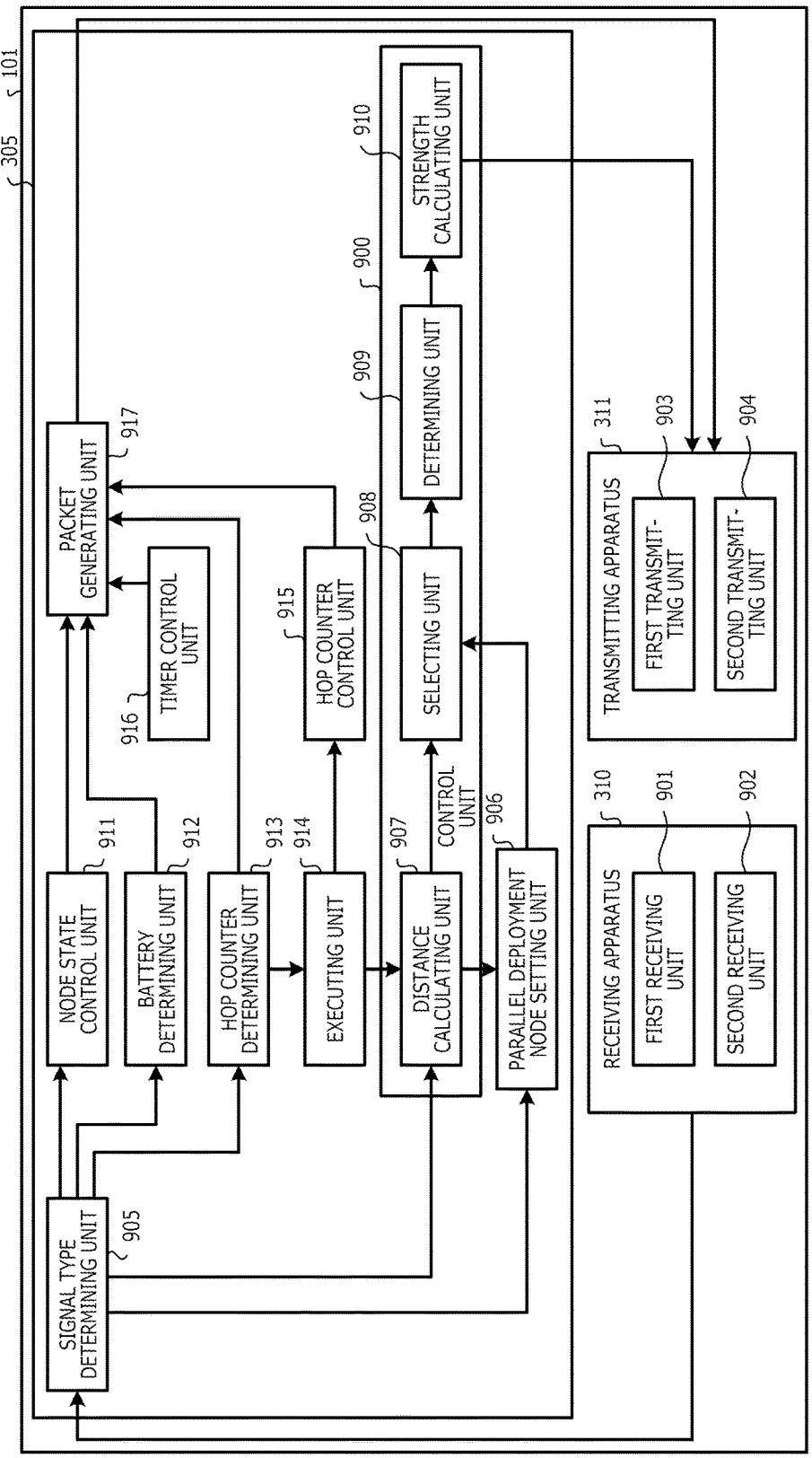
FIG. 9 is a block diagram of an example of a functional configuration of the communications node during operation.

FIG. 9 is a block diagram of an example of a functional configuration of a communications node during operation. The communications node 101 includes a control unit 900, a first receiving unit 901, a second receiving unit 902, a first transmitting unit 903, a second transmitting unit 904, a signal type determining unit 905, and a parallel deployment node setting unit 906. The communications node 101 further includes a node state control unit 911, a battery determining unit 912, a hop counter determining unit 913, an executing unit 914, a hop counter control unit 915, a timer control unit 916, and a packet generating unit 917.

The first receiving unit 901 and the second receiving unit 902 are realized by the receiving apparatus 310. The first transmitting unit 903 and the second transmitting unit 904 are realized by the transmitting apparatus 311. Processing of the signal type determining unit 905 to the packet generating unit 917, for example, is coded in a communications program stored in a storage apparatus accessible by the MCU 305 such as the non-volatile memory 308. The MCU 305 reads out the communications program stored in the non-volatile memory 308 and executes the processing coded in the communications program, whereby the processing of the signal type determining unit 905 to the packet generating unit 917 is realized. Further, when the MCU 305 is not activated, the battery determining unit 912 is realized by the PMU 302. Processing results of the signal type determining unit 905 to the packet generating unit 917 are stored to a storage apparatus such as the RAM 306 and the non-volatile memory 308.

The signal type determining unit 905 determines the type of the signal received by the receiving apparatus 310. As described, based on the signal ID included in each signal, the signal type determining unit 905 is able to determine the type of the signal received. Further, the packet generating unit 917 generates packets for signals transmitted by the transmitting apparatus 311. The packets of each signal are as described above and therefore, further description of the signal type determining unit 905 and the packet generating unit 917 is omitted hereinafter.

The timer control unit 916 performs control such that at constant intervals timed by a timer of the communications node 101 thereof, a nearby-node confirmation signal s1 is transmitted. The first transmitting unit 903, under the control of the timer control unit 916, transmits the nearby-node confirmation signal s1 to the plural communications nodes 101 that are capable of performing direction wireless communication with the communications node 101 of the first transmitting unit 903. Here, the transmission strength for transmitting the nearby-node confirmation signal s1 is constant and, for example, is a transmission strength set by a setting signal before operation.

The first receiving unit 901 receives from the plural communications nodes 101 that received the nearby-node confirmation signal s1, a response signal s2 for the nearby-node confirmation signal s1 transmitted by the first transmitting unit 903. Further, the first receiving unit 901 may receive a response signal that is from a first communications node 101 capable of responding among the plural communications nodes 101 that received the nearby-node confirmation signal s1 and that is for the nearby-node confirmation signal s1 transmitted by the first transmitting unit 903. For example, a communications node 101 that is unable to respond despite having received the nearby-node confirmation signal s1 is a communications node 101 whose remaining battery power is insufficient and therefore, despite receiving the nearby-node confirmation signal s1 is unable to respond to the nearby-node confirmation signal s1 and does not send a response signal s2. Further, for example, a communications node 101 that has failed has a high possibility of being unable to receive the nearby-node confirmation signal s1 and therefore, cannot transmit a response signal s2. Thus, a nearby communications node 101 from which there is no response signal s2 for the nearby-node confirmation signal s1 can be viewed to be failing.

The parallel deployment node setting unit 906 sets as nodes capable of parallel deployment, communications nodes 101 that are the transmission sources of the response signals s2 received by the first receiving unit 901. More specifically, the parallel deployment node setting unit 906 correlates and stores to a storage apparatus such as the RAM 306 and the non-volatile memory 308, the reception strength of the response signal s2 and the identifier information of each communication node that is a transmission source of a response signal s2 received by the first receiving unit 901. Information stored in the non-volatile memory 308 and indicating nodes capable of parallel deployment is information correlating the identifier information of a communications node 101 that transmitted a response signal s2 and the reception strength of the response signal s2. Further, in place of the reception strength of the response signal s2, a distance that is calculated by a distance calculating unit 907 described hereinafter may be correlated with the identifier information of a communications node 101 that is a transmission source of a response signal s2.

The second receiving unit 902 receives a nearby-node confirmation signal s1 from any of the plural communications nodes 101. The battery determining unit 912 determines if the remaining power of the battery 303 is a threshold or greater. The threshold, for example, is a value based on the sum of the amount of power necessary to execute the partial processes included in the data processing, the amount of power necessary to receive a parallel deployment processing request signal s3, and the amount of power necessary to transmit a processing handover request signal s6. The threshold, for example, is prestored to a storage apparatus such as the non-volatile memory 308. Thus, determination is made of whether the remaining power of the battery 303 is sufficient with respect to the sum of the amount of power necessary to execute the partial processes of the data processing, the amount of power necessary to receive a parallel deployment processing request signal s3, and the amount of power necessary to transmit a processing handover request signal s6.

If the amount of power is determined to be the threshold or greater by the battery determining unit 912, the packet generating unit 917 generates a response signal s2 for the nearby-node confirmation signal s1. The second transmitting unit 904 transmits to the transmission source of the nearby-node confirmation signal s1, the response signal s2 generated by the packet generating unit 917 for the nearby-node confirmation signal s1. Here, the transmission strength for transmitting the response signal s2 is a constant strength that is, for example, a strength preset before operation. If the power amount is determined to be less than the threshold by the battery determining unit 912, the second transmitting unit 904 does not transmit a response signal s2 for the nearby-node confirmation signal s1.

Figure 10:
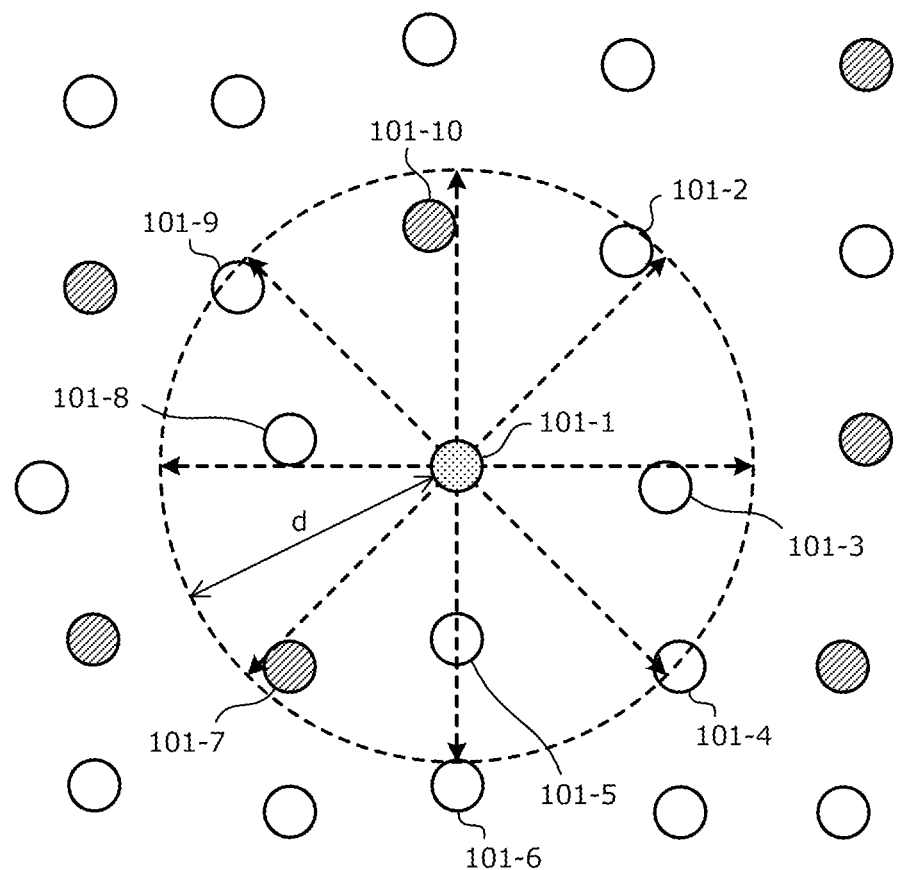
FIG. 10 is a diagram depicting an example of nearby-node confirmation signal transmission.

FIG. 10 is a diagram depicting an example of nearby-node confirmation signal transmission. For example, the communications node 101-1 transmits a nearby-node confirmation signal s1, by the set transmission strength, to communications nodes 101 within a fixed distance d from the communications node 101-1. Communications nodes 101 within the fixed distance d from the communications node 101-1 are the communications node 101-2 to 101-10.

Figure 11:
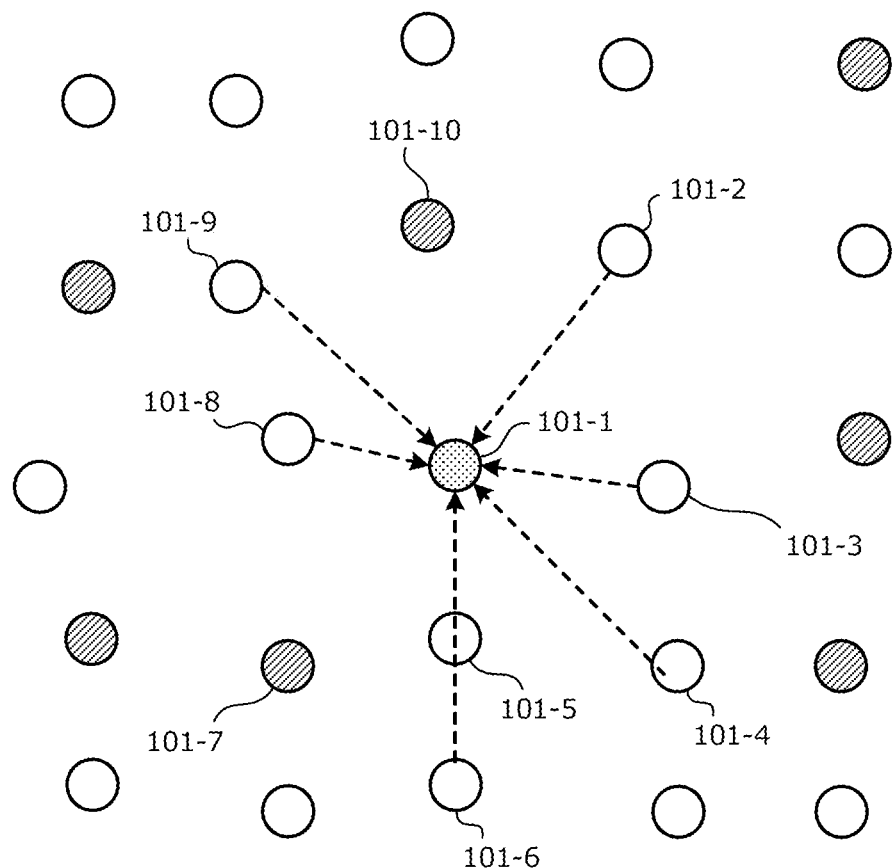
FIG. 11 is a diagram depicting an example of transmission of a response signal for a nearby-node confirmation signal.

FIG. 11 is a diagram depicting an example of transmission of a response signal for a nearby-node confirmation signal. In the example depicted in FIG. 11, the communications nodes 101-7, 101-10 have failed or the power of the battery 303 thereof is less than the threshold and therefore, do not transmit a response signal s2 for the nearby-node confirmation signal s1. Further, in the example depicted in FIG. 11, the communications nodes 101-2 to 101-6, 101-8, 101-9 transmit a response signal s2 for the nearby-node confirmation signal s1 to the communications node 101-1, which is the transmission source of the nearby-node confirmation signal s1.

The control unit 900 sets based on the reception strength of the response signal s2 received by the first receiving unit 901, the transmission strength for transmission to a request recipient communications node to which the data processing is to be requested and that is selected from among the plural communications nodes 101 that are transmission sources of the response signal s2. More specifically, the control unit 900 includes the distance calculating unit 907, a selecting unit 908, a determining unit 909, and a strength calculating unit 910.

The distance calculating unit 907 calculates based on the reception strength of the response signal s2 received by the first receiving unit 901, the distance between the communications node 101 of the distance calculating unit 907 and the transmission source of the response signal s2. The reception strength is obtained from the antennas of the receiving apparatus 310 and the transmitting apparatus 311. More specifically, the distance calculating unit 907 calculates the reception strength loss of the response signal s2, based on the reception strength of the response signal s2, the transmission strength [dBm] of the response signal s2, the transmission antenna absolute gain [dBi], and the reception antenna absolute gain [dBi]. The distance calculating unit 907 substitutes the reception strength of the received response signal s2 into the first function that when provided the reception strength, obtains the reception strength loss, whereby the distance calculating unit 907 calculates the reception strength loss of the response signal s2. The first function obtains the reception strength loss of the response signal s2 by subtracting the obtained reception strength of the response signal s2 from the sum of transmission strength of the response signal s2, the transmission antenna absolute gain, and the reception antenna absolute gain. Transmission antenna absolute gain and the reception antenna absolute gain are values based on the antennas of the receiving apparatus 310 and the transmitting apparatus 311, are fixed values, and are prestored to a storage apparatus such as the non-volatile memory 308, etc. The distance calculating unit 907 calculates the distance between communications nodes 101 by substituting the calculated loss of the reception strength of the response signal s2 into the second function that is based on equation (7), which can calculate the distance between communications nodes 101 when provided the loss. In equation (7), L represents loss; d represents the distance [m]; λ represent wavelength [m]. The wavelength λ is a fixed value and prestored to a storage apparatus such as the non-volatile memory 308. For example, the distance calculating unit 907 correlates and stores to a storage apparatus such as the RAM 306 and the non-volatile memory 308, the identifier information of the transmission source of the response signal s2 and the calculate distance.

$$L = \left(\frac{4\pi d}{\lambda}\right)^2 \quad (7)$$

Figure 12:
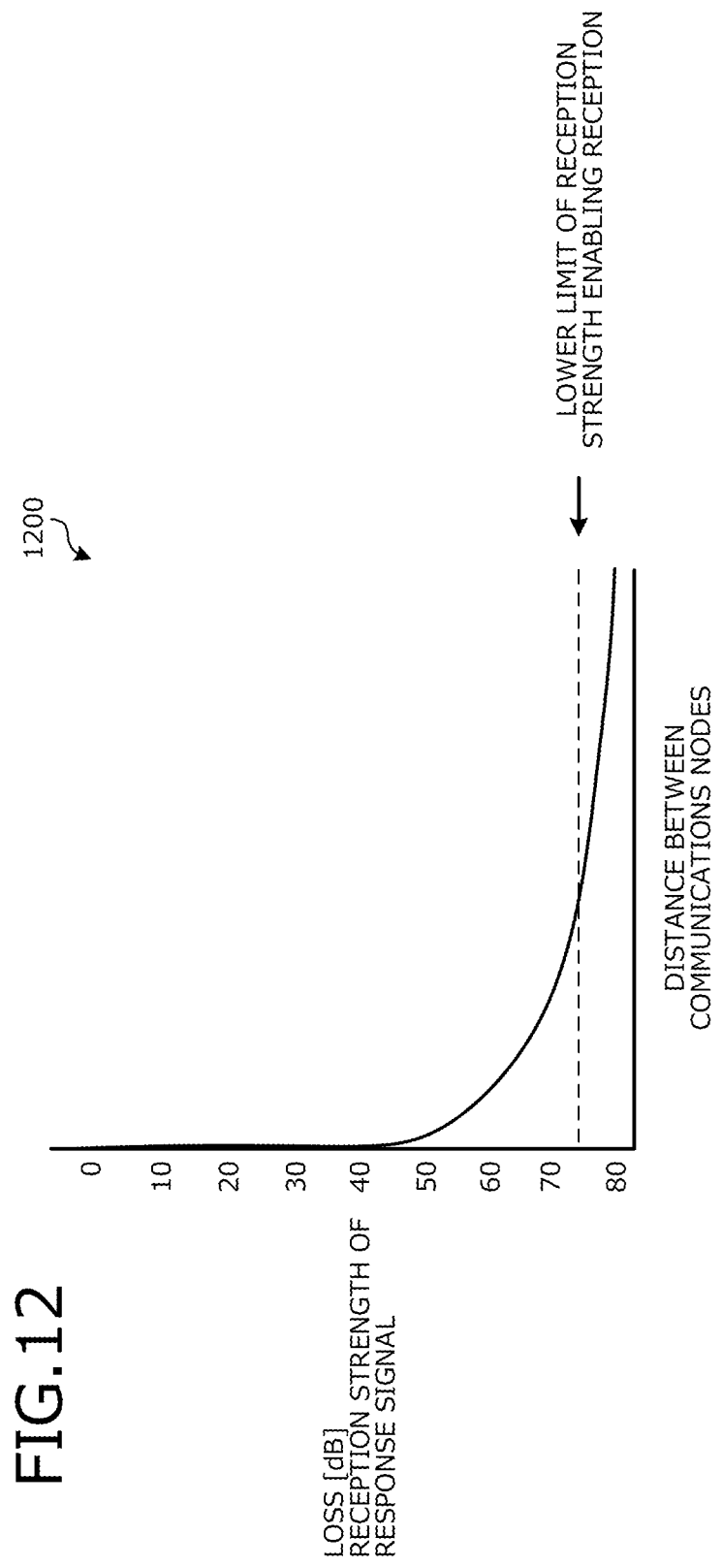
FIG. 12 is a diagram depicting an example of a function for calculating a distance between communications nodes.

FIG. 12 is a diagram depicting an example of a function for calculating the distance between communications nodes. Graph 1200 is an example of plotted values when the reception strength loss is substituted into the function that calculates the distance between communications nodes 101. Graph 1200 indicates that the greater the reception strength loss of the response signal is, the farther the distance is between communications node 101; and the smaller the reception strength loss of the response signal is, the closer the distance is between communications node 101.

Next, a sensing event by the sensor 304 occurs. Based on the distances (calculated by the distance calculating unit 907) between the communications node 101 of the selecting unit 908 and nodes capable of parallel deployment, the selecting unit 908 selects from among the nodes capable of parallel deployment, a request recipient to which execution of data processing for the sensing event is to be requested.

Further, when the data processing for the sensing event is data processing that can be divided into plural partial processes for parallel processing, the selecting unit 908 selects second communications nodes 101 of a predetermined number or less from the first communications nodes 101, based on the reception strength of the received response signal s2. The predetermined number is assumed to be defined as a predetermined degree of parallelism, by a designer of programs concerning the data processing. The predetermined number, for example, is prestored to a storage apparatus such as the ROM 307 and the non-volatile memory 308. More specifically, if the number of first communications nodes 101 is greater than the predetermined number when second communications nodes 101 are selected, the selecting unit 908 selects first communications nodes 101 of the predetermined number, based on the reception strength of the response signal s2 received by the first receiving unit 901. Further, if the number of first communications nodes 101 is the predetermined number or less when second communications nodes 101 are selected, the selecting unit 908 selects all of the first communications node 101.

Based on the reception strength of the received response signal s2 and information corresponding to the processing volumes of the respective partial processes of the predetermined number, the determining unit 909 determines for each request recipient selected by the selecting unit 908, the partial process that is to be requested among the predetermined number thereof.

Figure 13:
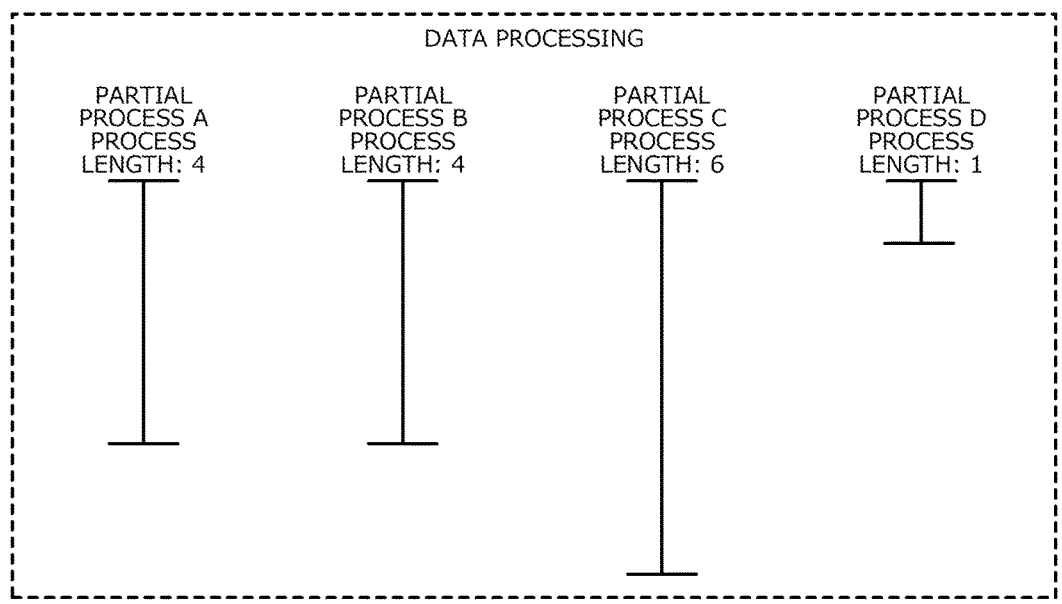
FIG. 13 is a diagram of information corresponding to processing volumes of partial processes and the partial processes.

FIG. 13 is a diagram of information corresponding to processing volumes of partial processes and the partial processes. For example, data processing can be divided into 4 partial processes, partial process A, partial process B, partial process C, and partial process D for parallel processing. The process length of partial process A is 4. Here, the process length is the necessary hop count described above and the number of communications nodes 101 that are to execute the partial process to complete execution of the partial process. The process length of partial process B is 4; the process length of partial process C is 6; and the process length of partial process D is 1.

Figure 14:
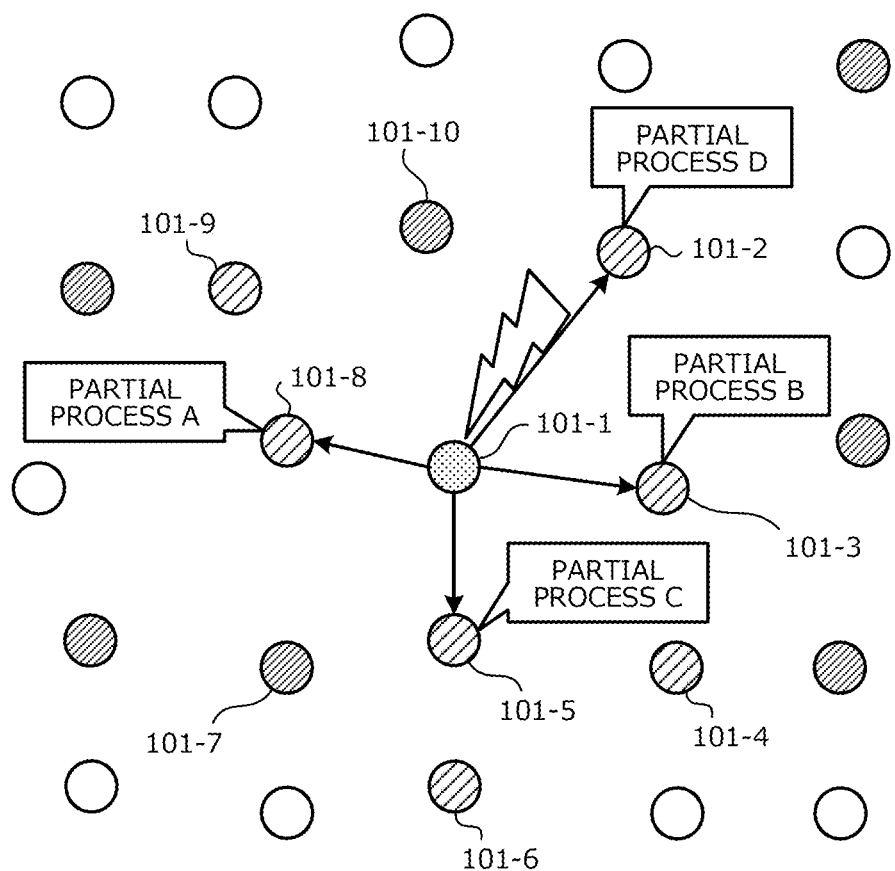
FIG. 14 is a diagram depicting a first example of selection and determination.

FIG. 14 is a diagram depicting a first example of selection and determination. For example, the number of nodes capable of parallel deployment is 7 and the degree of parallelism is 4 and therefore, the selecting unit 908 selects in ascending order of the calculated distances, 4 nodes capable of parallel deployment. As a result, the data processing can be distributed to a greater extent.

The determining unit 909 determines in ascending order of distance, assignment of partial processes for which the process length is larger. For example, partial process C is assigned to the communications node 101-5; partial process A is assigned to the communications node 101-8; partial process B is assigned to the communications node 101-3; and partial process D is assigned to the communications node 101-2.

The second transmitting unit 904 transmits to each of the second communications nodes 101 selected by the selecting unit 908, a request signal requesting the data processing determined for the second communications node 101 by the determining unit 909.

Figure 15:
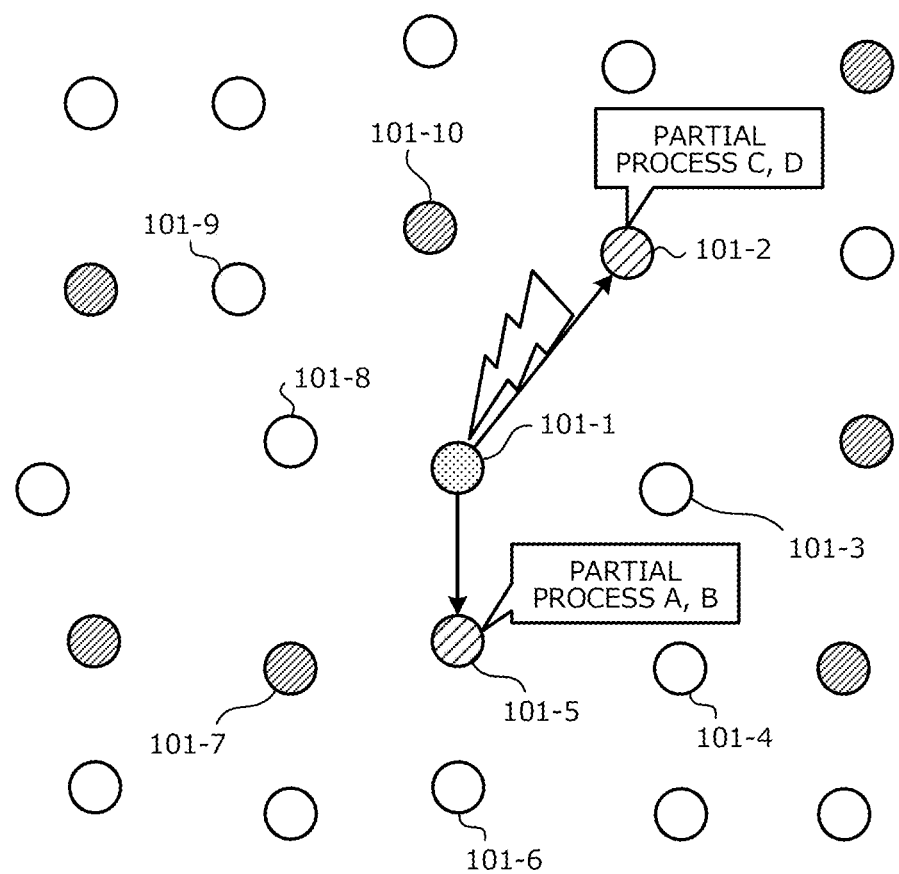
FIG. 15 is a second example of selection and determination.

FIG. 15 is a second example of selection and determination. For example, as depicted in FIG. 15, when the number of nodes capable of parallel deployment is 2 and the degree of parallelism is 4, the selecting unit 908 selects 2 communications nodes 101. The determining unit 909 determines assignment of the partial processes such that the total process length increases in descending order of distance. For example, the determining unit 909 determines assignment of partial process A and partial process B to the communications node 101-5 and assignment of partial process C and partial process D to the communications node 101-2.

The strength calculating unit 910 calculates based on the reception strengths of the response signals s2 from the second communications nodes 101 selected by the selecting unit 908, transmission strengths that enable communication between the communications node 101 of the strength calculating unit 910 and the second communications nodes 101. Here, the strength calculating unit 910 calculates based on the calculated distances between the communications node 101 of the strength calculating unit 910 and the second communications nodes 101 selected by the selecting unit 908, transmission strengths enabling communication between the communications node 101 of the strength calculating unit 910 and the second communications nodes 101. More specifically, the strength calculating unit 910 calculates based on the calculated distance between the communications node 101 of the strength calculating unit 910 and each second communications node 101 selected by the selecting unit 908, the smallest transmission strength among the transmission strengths enabling communication between the communications node 101 of the strength calculating unit 910 and the second communications node 101. More specifically, the strength calculating unit 910 calculates transmission strength loss by substituting each distance into the third function, which is based on equation (8) described hereinafter and capable of obtaining the transmission strength loss when provided the distance. The strength calculating unit 910 obtains the transmission strength by substituting each calculated transmission strength loss into the fourth function, which obtains the transmission strength when provided the transmission strength loss. The fourth function obtains the transmission strength by subtracting the sum of the transmission antenna absolute gain and the reception antenna absolute gain from the sum of the provided transmission strength loss and the smallest reception strength that can be received. In equation (8), L represents loss; d represents distance [m]; and λ represents wavelength [m]. The wavelength λ is a fixed value and prestored in a storage apparatus such as the non-volatile memory 308.

$$d = \frac{\lambda\sqrt{L}}{4\pi} \quad (8)$$

Figure 16:
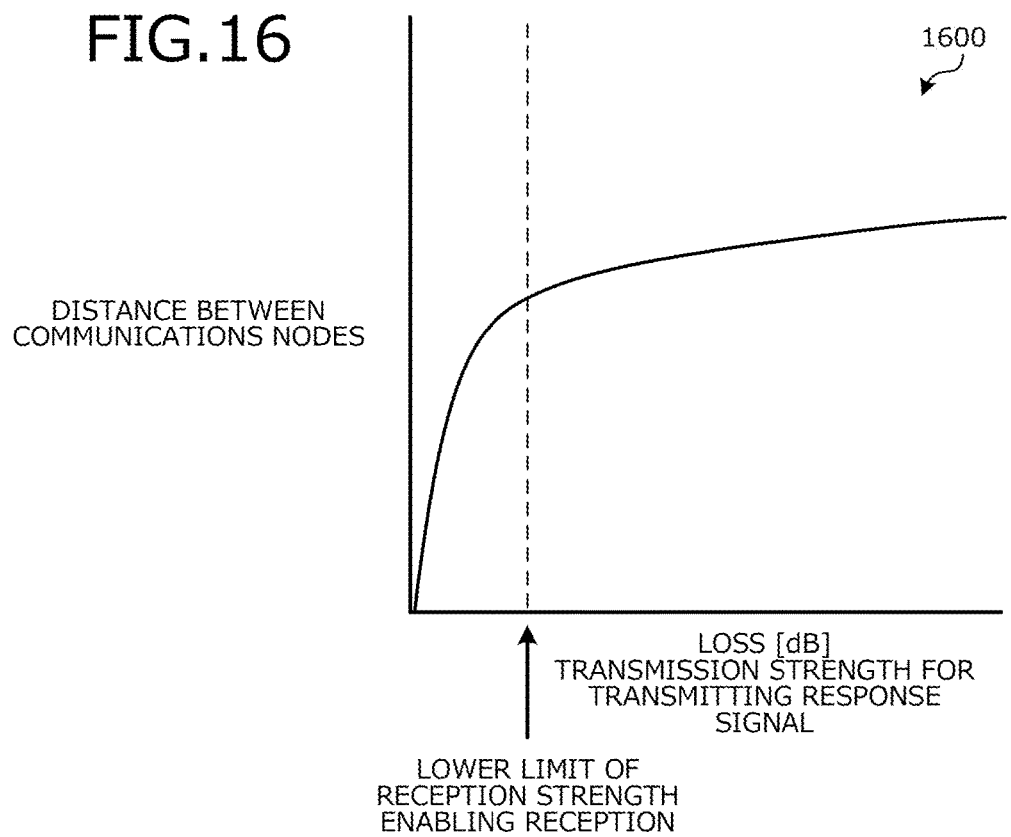
FIG. 16 is a diagram depicting an example of transmission strength calculation.

FIG. 16 is a diagram depicting an example of transmission strength calculation. Graph 1600 is an example of plotted values when the distance is substituted into a function that calculates the transmission strength loss. Graph 1600 indicates that the farther the distance between communications nodes 101 is, the greater the transmission strength loss becomes; and the closer the distance is between communications nodes 101, the smaller the transmission strength loss becomes.

The second transmitting unit 904 transmits at the transmission strengths calculated by the strength calculating unit 910, a request signal requesting execution of the data processing, to the second communications nodes 101.

The second receiving unit 902 receives from third communications nodes 101 among nearby communications nodes 101, a parallel deployment processing request signal s3 requesting execution of the data processing. The node state control unit 911 sets the communications node 101 state to "2", if the received parallel deployment processing request signal s3 indicates the request recipient of the execution of the data processing to be the communications node 101 of the node state control unit 911. Subsequently, the executing unit 914 executes a portion of the data processing requested by the parallel deployment processing request signal s3. The hop counter control unit 915 increments the value of the hop counter for the data processing requested by the parallel deployment processing request signal s3, by 1.

The first transmitting unit 903 transmits a nearby-node processing request confirmation signal s4 to the first communications node 101. More specifically, the first transmitting unit 903 transmits a nearby-node processing request confirmation signal s4 to the nodes that are capable of parallel deployment as indicated in the storage apparatus. The first receiving unit 901 receives a response signal s5 for the nearby-node processing request confirmation signal s4 from any one among the nodes capable of parallel deployment.

The distance calculating unit 907 calculates based on the reception strength of the response signal s5, the distance between the communications node 101 of the distance calculating unit 901 and the transmission source of the response signal s5. The selecting unit 908 selects as a request recipient of a processing handover request signal s6, the transmission source of a response signal s5 and for which the calculated distance is shortest.

The second transmitting unit 904 transmits to the communications node 101 selected by the selecting unit 908, the value of the hop counter incremented by the hop counter control unit 915 and a processing handover request signal s6 that includes execution results obtained by the executing unit 914. As a result, the second transmitting unit 904 is able to transmit a processing handover request signal s6 that requests execution of the data processing exclusive of the portion executed by the executing unit 914 and transfer of the partial processing execution by the executing unit 914 to the communications apparatus 201.

The node state control unit 911 sets the communications node 101 state to "0" after the processing handover request signal s6 has been transmitted.

Figure 17:
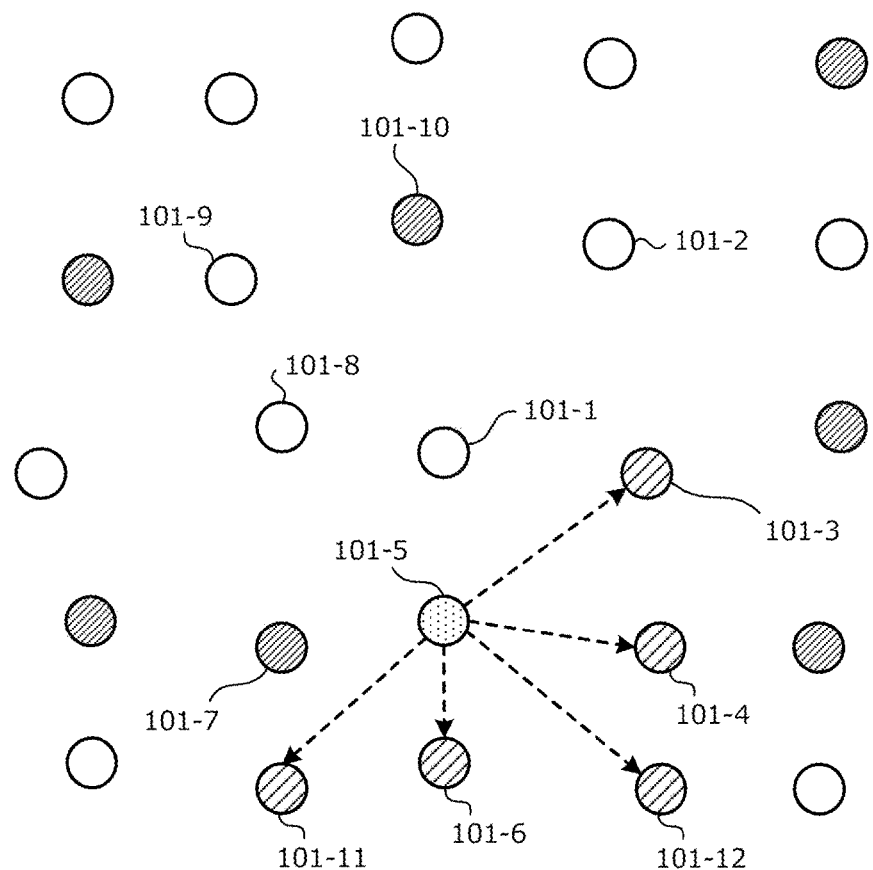
FIG. 17 and FIG. 18 are diagrams depicting an example of processing handover requesting.
Figure 18:
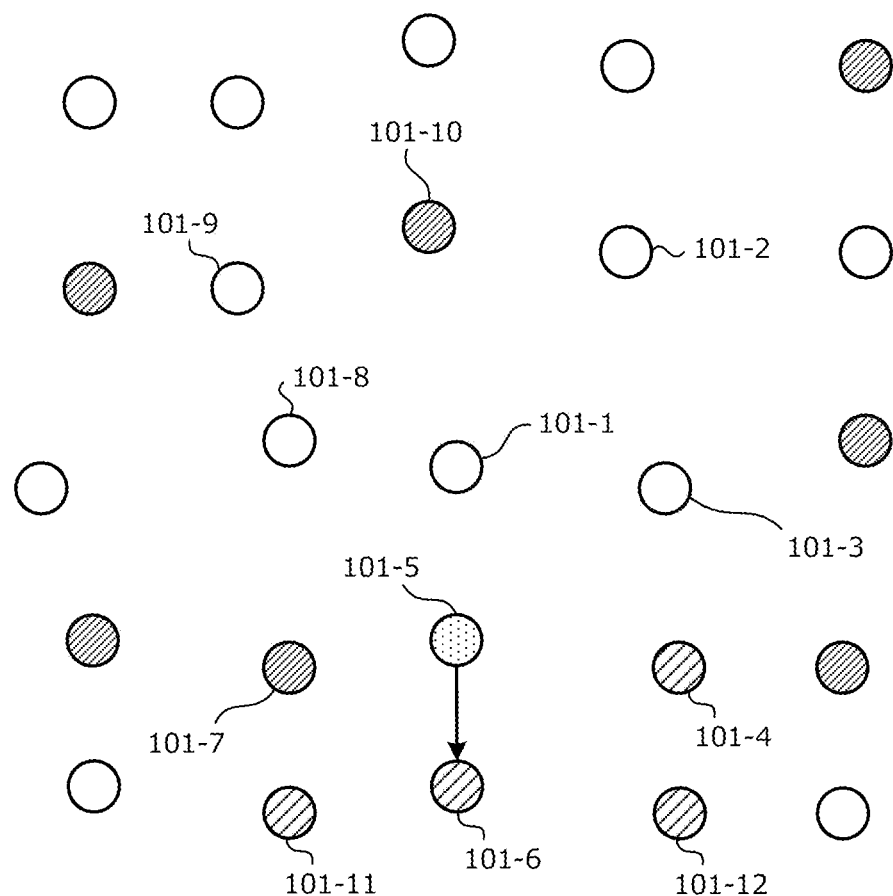

FIG. 17 and FIG. 18 are diagrams depicting an example of processing handover requesting. The communications node 101-5 receives a parallel deployment processing request signal s3 that is from the communications node 101-1. The communications node 101-5 executes a portion of the data processing requested by the parallel deployment processing request signal s3. The communications node 101-5 transmits a nearby-node processing request confirmation signal s4 to nodes capable of parallel deployment. For the communications node 101-5, nodes capable of parallel deployment include the communications nodes 101-3, 101-4, 101-6, 101-11, and 101-12.

For example, the communications node 101-5 is assumed to receive a response signal s5 for the nearby-node processing request confirmation signal s4 from all of the nodes capable of parallel deployment, for communications node 101-5. The communications node 101-5 calculates the distance between the communications node 101 thereof and each of the nodes capable of parallel deployment, based on the reception strength of the response signal s5. The communications node 101-5 selects as a destination of the processing handover request signal s6, the communications node 101-6, which has the closest distance. The communications node 101-5 transmits a processing handover request signal s6 to the communications node 101-6.

Further, the second receiving unit 902 receives a processing handover request signal s6 from a third communications node 101 among nearby communications nodes 101. If the request recipient of the data processing included in the processing handover request signal s6 is the communications node 101 of the second receiving unit 902, the hop counter determining unit 913 thereof determines if the value of the hop counter included in the processing handover request signal s6 is the necessary hop count or greater.

The executing unit 914 executes the data processing requested by the processing handover request signal s6 if the hop counter determining unit 913 determines that the value of the hop counter is less than the necessary hop count. The hop counter control unit 915 increments the value of the hop counter by 1. Thereafter, as described above, the communications node 101 selects the closest communications node 101 from the nodes capable of parallel deployment, based on the response signals s5 for the nearby-node processing request confirmation signal s4 and transmits a processing handover request signal s6 to the selected communications node 101.

If the hop counter determining unit 913 determines that the value of the hop counter is the necessary hop count or greater, the executing unit 914 does not execute the data processing. The communications node 101 selects the closest communications node 101 from the nodes capable of parallel deployment, based on the nearby-node processing request confirmation signal s4 and transmits a processing handover request signal s6 to the selected communications node 101.

The second receiving unit 902 receives a nearby-node processing request confirmation signal s4. The battery determining unit 912 determines if the remaining power of the battery 303 an activation threshold or greater, when the second receiving unit 902 receives the nearby-node processing request confirmation signal s4. The activation threshold is the amount of power necessary for activation. If the remaining power is determined to be the activation threshold or greater, the node state control unit 911 stores as a processing handover source node and stores to a storage apparatus such as the RAM 306 and a disk, the identifier information of the transmission source of the nearby-node processing request confirmation signal s4. The node state control unit 911 sets the state to "1". The second transmitting unit 904 transmits a response signal s5 for the nearby-node processing request confirmation signal s4 to the transmission source of the nearby-node processing request confirmation signal s4.

Figure 19:
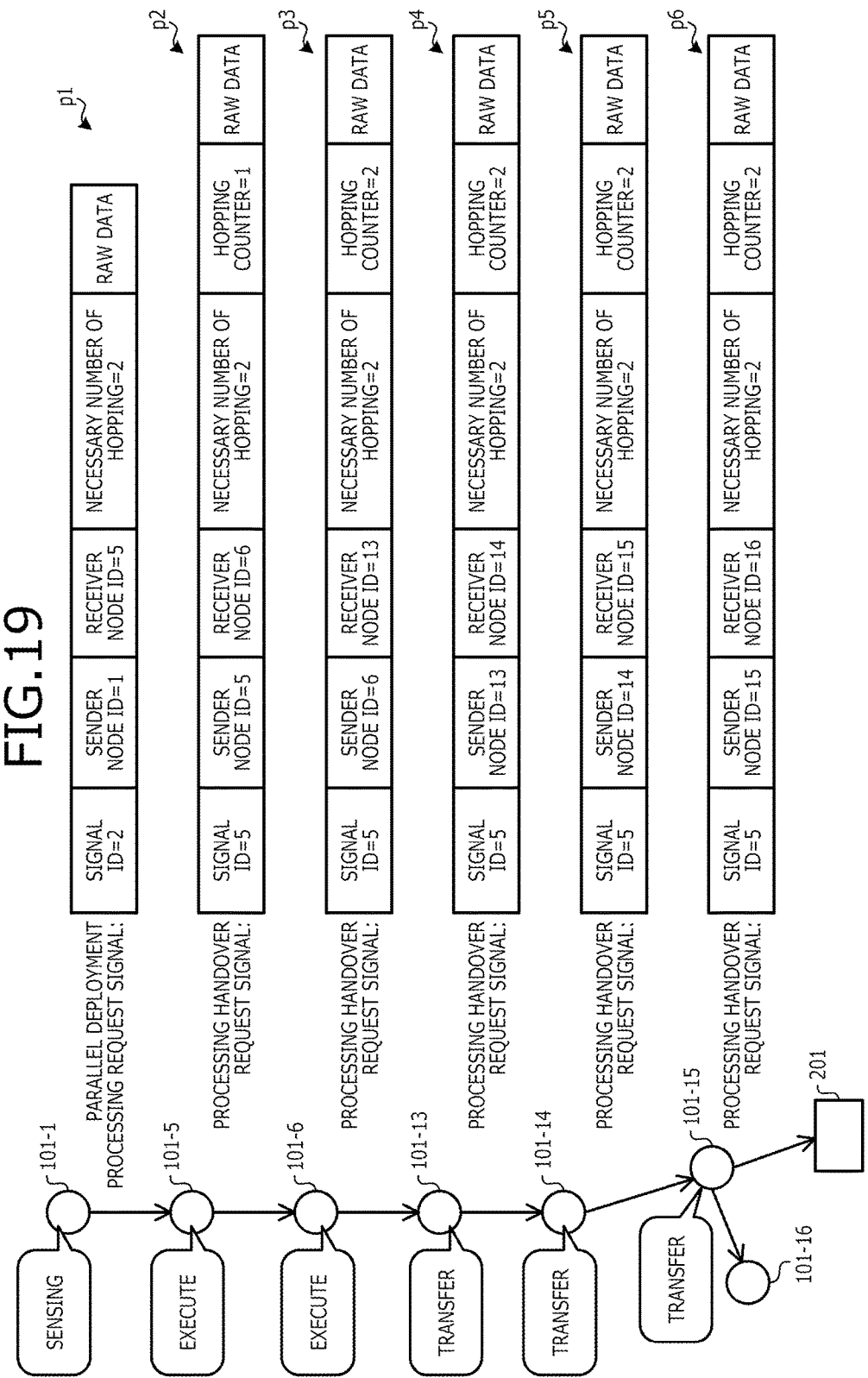
FIG. 19 is a diagram depicting an example of transfer of a processing handover request signal.
Figure 20:
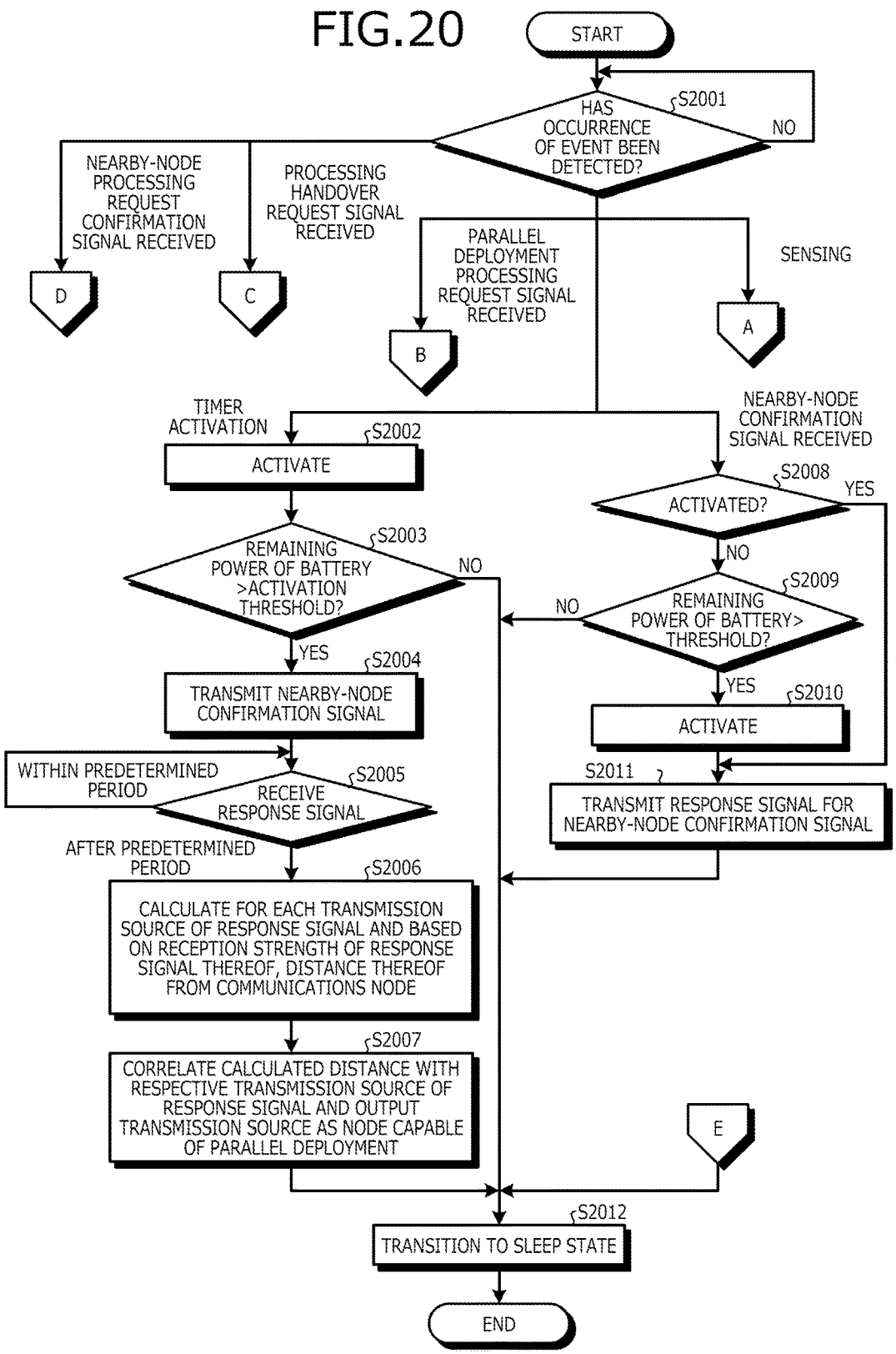

FIG. 19 is a diagram depicting an example of transfer of a processing handover request signal. Data processing corresponding to a sensing event that occurred at the communications node 101-1 is executed by communications nodes 101 between the communications node 101-1 and the communications apparatus 201. Processing results of the data processing are transferred by multihop communication among the communications nodes 101 between the communications node 101-1 and the communications apparatus 201. FIG. 19 depicts packets p1 to p6 of the signals transmitted by the communications nodes 101.

For example, the value of "necessary number of hopping" of packet p1 of the parallel deployment processing request signal s3 is 2. Therefore, the communications node 101-5 that receives the parallel deployment processing request signal s3 transmitted by the communications node 101-1 and the communications node 101-6 that receives the processing handover request signal s6 transmitted by communications node 101-5 execute the data processing. Thereafter, the value of the "Hopping Counter" of packet p3 of the processing handover request signal s6 transmitted by the communications node 101-6 and the value of the "necessary number of hopping" coincide. Therefore, the communications node 101-13, the communications node 101-14, and the communications node 101-15 transfer a processing handover request signal s6 to the communications apparatus 201, as a transfer signal of processing results of the data processing.

FIGS. 20, 21, 22, 23, 24, 25, and 26 are flowcharts of an example of a procedure of a communications process of a communications node. The communications node 101, via the PMU 302, determines whether the occurrence of an event has been detected (step S2001). If the occurrence of an event has not been detected (step S2001: NO), communications node 101, via the PMU 302, returns to step S2001.

If an activation event by a timer has occurred (step S2001: timer activation), the communications node 101, via the PMU 302, activates the MCU 305 (step S2002). The communications node 101, via the MCU 305, determines whether the remaining power of the battery 303>activation threshold is true (step S2003). If the remaining power of the battery 303>activation threshold is not true (step S2003: NO), the communications node 101, via the MCU 305, transitions to step S2012. If the remaining power of the battery 303>activation threshold is true (step S2003: YES), communications node 101, via the MCU 305 and the transmitting apparatus 311, transmits a nearby-node confirmation signal s1 (step S2004). The communications node 101, via the receiving apparatus 310, receives response signals s2 during a predetermined time and determines whether the predetermined period has elapsed after transmitting the nearby-node confirmation signal s1 (step S2005).

If the predetermined period has not elapsed (step S2005: within predetermined period), the communications node 101, via the receiving apparatus 310, returns to step S2005. On the other hand, if the predetermined period has elapsed (step S2005: after predetermined period), the communications node 101, via the MCU 305, calculates for each transmission source of the response signal s2 and based on the reception strength of the response signal s2 thereof, the distance thereof from the communications node 101 (step S2006). The communications node 101, via the MCU 305, correlates the calculated distance with the respective transmission source of the response signal s2 and outputs the transmission source as a node capable of parallel deployment (step S2007). The communications node 101, via the MCU 305, transitions to a sleep state (step S2012), and ends a series of the operations.

If a nearby-node confirmation signal s1 is received (step S2001: nearby-node confirmation signal received), the communications node 101, via the PMU 302, determines whether the MCU 305 is activated (step S2008). If the MCU 305 is activated (step S2008: YES), the communications node 101, via the MCU 305, transitions to step S2011. On the other hand, if the MCU 305 is not activated (step S2008: NO), the communications node 101, via the PMU 302, determines whether the remaining power of the battery 303>threshold is true (step S2009).

If the remaining power of the battery 303>threshold is true (step S2009: YES), the communications node 101, via the PMU 302, activates the MCU 305 (step S2010). The communications node 101, via the MCU 305 and the transmitting apparatus 311, transmits a response signal s2 for the nearby-node confirmation signal s1 (step S2011), and transitions to step S2012. On the other hand, at step S2009, if the remaining power of the battery 303>threshold is not true (step S2009: NO), the communications node 101, via the PMU 302, transitions to step S2012.

If a sensing event has occurred (step S2001: sensing), the communications node 101, via the PMU 302, activates the MCU 305 (step S2101). The communications node 101, via the MCU 305, determines whether the remaining power of the battery 303>activation threshold is true (step S2102). If the remaining power of the battery 303>activation threshold is not true (step S2102: NO), the communications node 101, via the MCU 305, transitions to step S2012. If the remaining power of the battery 303>activation threshold is true (step S2102: YES), the communications node 101, via the MCU 305, determines whether the number of nodes capable of parallel deployment≥maximum degree of parallelism is true (step S2103).

If the number of nodes capable of parallel deployment≥maximum degree of parallelism is true (step S2103: YES), the communications node 101, via the MCU 305, selects from the nodes capable of parallel deployment and in ascending order of distance, nodes of a count equivalent to the maximum degree of parallelism, as request recipients (step S2104).

The communications node 101, via the MCU 305, identifies the necessary hop count of the partial processes (step S2105). The communications node 101, via the MCU 305, determines assignment of the partial processes, based on the distance and necessary hop count of the partial processes with respect to the selected nodes capable of parallel deployment (step S2106). The communications node 101, via the MCU 305, calculates the transmission strength based on the distances concerning the selected nodes capable of parallel deployment (step S2107). The communications node 101, via the MCU 305 and the transmitting apparatus 311, transmits a parallel deployment processing request at the calculated transmission strengths (step S2108), and transitions to step S2012.

If the number of nodes capable of parallel deployment≥maximum degree of parallelism is not true (step S2103: NO), the communications node 101, via the MCU 305, selects all of the nodes capable of parallel deployment, as request recipients (step S2201). The communications node 101, via the MCU 305, sets "assigned process unit=degree of parallelism/number of nodes capable of parallel deployment" (step S2202). The communications node 101, via the MCU 305, identifies the necessary hop count of the partial processes (step S2203). The communications node 101, via the MCU 305, determines assignment of the partial processes based on the distances and necessary hop count with respect to the selected nodes capable of parallel deployment (step S2204).

The communications node 101, via the MCU 305, determines whether the remainder of "degree of parallelism/number of nodes capable of parallel deployment"=0 is true (step S2205). If the remainder of "degree of parallelism/number of nodes capable of parallel deployment"=0 is not true (step S2205: NO), the communications node 101, via the MCU 305, determines assignment of the remaining partial processes in ascending order of distance (step S2206), and transitions to step S2107. The remaining partial processes are partial processes for which a request recipient is not determined. If the remainder of "degree of parallelism/number of nodes capable of parallel deployment"=0 is true (step S2205: YES), communications node 101, via the MCU 305, transitions to step S2107.

Further, if a parallel deployment processing request signal s3 has been received (step S2001: parallel deployment processing request signal received), the communications node 101, via the PMU 302, determines whether the MCU 305 is activated (step S2301). If the MCU 305 is activated (step S2301: YES), the communications node 101, via the PMU 302, transitions to step S2304.

If the MCU 305 is not activated (step S2301: NO), the communications node 101, via the PMU 302, determines whether the remaining power of the battery 303>activation threshold is true (step S2302). If the remaining power of the battery 303>activation threshold is not true (step S2302: NO), the communications node 101, via the PMU 302, transitions to step S2012. If the remaining power of the battery 303>activation threshold is true (step S2302: YES), communications node 101, via the PMU 302, activates the MCU 305 (step S2303). The communications node 101, via the MCU 305, determines whether the request recipient is the communications node 101 thereof (step S2304). Here, the identifier information of the request recipient is the "receiver node ID" included in the parallel deployment processing request signal s3. If the identifier information of the request recipient does not identify the communications node 101 (step S2304: NO), the communications node 101, via the MCU 305, transitions to step S2012.

If the identifier information of the request recipient identifies the communications node 101 (step S2304: YES), the communications node 101, via the MCU 305, sets state=2 (step S2305). The communications node 101, via the MCU 305, determines whether the value of the hop counter≤necessary hop count is true (step S2306). If the value of the hop counter≤necessary hop count is not true (step S2306: NO), the communications node 101, via the MCU 305, transitions to step S2308.

If the value of the hop counter≤necessary hop count is true (step S2306: YES), the communications node 101, via the MCU 305, executes the requested data processing (step S2307). Thereafter, the communications node 101, via the MCU 305, increments the value of the hop counter (step S2308).

The communications node 101, via the MCU 305, transmits a nearby-node processing request confirmation signal s4 to the nodes capable of parallel deployment (step S2401). The communications node 101, via the MCU 305 and the receiving apparatus 310, receives response signals s5 during a predetermined period and determines whether the predetermined period has elapsed after transmitting the nearby-node processing request confirmation signal s4 (step S2402). If the predetermined period has not elapsed (step S2402: within predetermined period), the communications node 101, via the MCU 305 and the receiving apparatus 310, returns to step S2402. If the predetermined period has elapsed (step S2402: predetermined period elapsed), the communications node 101, via the MCU 305, calculates based on the reception strength of each response signal s5, the distance between the communications node 101 and the transmission source of each response signal s5 (step S2403).

The communications node 101, via the MCU 305, selects the transmission source of the closest distance, as a request recipient communications node 101 (step S2404). The communications node 101, via the MCU 305, calculates the transmission strength based on the selected communications node 101 (step S2405). The communications node 101, via the MCU 305 and the transmitting apparatus 311, transmits at the calculated transmission strength, a processing handover request signal s6 to the selected communications node 101 (step S2406). The communications node 101, via the MCU 305, sets state=0 (step S2407), and transitions to step S2012.

If a processing handover request signal s6 is received (step S2001: processing handover request signal received), the communications node 101, via the PMU 302, determines whether the MCU 305 is activated (step S2501). If the MCU 305 is activated (step S2501: YES), the communications node 101, via the MCU 305, transitions to step S2504.

If the MCU 305 is not activated (step S2501: NO), the communications node 101, via the PMU 302, determines whether the remaining power of the battery 303>activation threshold is true (step S2502). If the remaining power of the battery 303>activation threshold is not true (step S2502: NO), the communications node 101, via the PMU 302, transitions to step S2012. If the remaining power of the battery 303>activation threshold is true (step S2502: YES), the communications node 101, via the PMU 302, activates the MCU 305 (step S2503). The communications node 101, via the MCU 305, determines whether the request recipient is the communications node 101 (step S2504).

If the request recipient is the communications node 101 (step S2504: YES), the communications node 101, via the MCU 305, transitions to step S2305. If the request recipient is not the communications node 101 (step S2504: NO), the communications node 101, via the MCU 305, determines whether the state is "1" (step S2505).

If the state is not "1" (step S2505: NO), the communications node 101, via the MCU 305, transitions to step S2012. If the state is "1" (step S2505: YES), the communications node 101, via the MCU 305, determines whether the requesting node is identical to the stored processing handover source node (step S2506). If the requesting node is identical to the stored processing handover source node (step S2506: YES), the communications node 101, via the MCU 305, sets state=0 (step S2507), and transitions to step S2012. If the requesting node is not identical to the stored processing handover source node (step S2506: NO), the communications node 101, via the MCU 305, transitions to step S2012.

If a nearby-node processing request confirmation signal s4 is received (step S2001: nearby-node processing request confirmation signal received), the communications node 101, via the PMU 302, determines whether the MCU 305 is activated (step S2601). If the MCU 305 is activated (step S2601: YES), the communications node 101, via the PMU 302, transitions to step S2604.

If the MCU 305 is not activated (step S2601: NO), the communications node 101, via the PMU 302, determines whether the remaining power of the battery 303>activation threshold is true (step S2602). If the remaining power of the battery 303>activation threshold is not true (step S2602: NO), the communications node 101, via the PMU 302, transitions to step S2012. On the other hand, if the remaining power of the battery 303>activation threshold is true (step S2602: YES), the communications node 101, via the PMU 302, activates the MCU 305 (step S2603). The communications node 101, via the MCU 305, determines whether the nearby node is the communications node 101 (step S2604). Here, the nearby node is the communications node 101 indicated by the "receiver node ID" included in the nearby-node processing request confirmation signal s4. If the nearby node is not the communications node 101 (step S2604: NO), the communications node 101, via the MCU 305, transitions to step S2012.

If the nearby node is the communications node 101 (step S2604: YES), the communications node 101, via the MCU 305, determines whether the state is "0" (step S2605). If the state is not "0" (step S2605: NO), the communications node 101, via the MCU 305, transitions to step S2012. If the state is "0" (step S2605: YES), the communications node 101, via the MCU 305, sets the state to "1" (step S2606). The communications node 101, via the MCU 305, stores the transmission source of the nearby-node processing request confirmation signal s4 as a processing handover source node (step S2607). The communications node 101, via the MCU 305 and the transmitting apparatus 311, transmits to the transmission source, a response signal s5 for the nearby-node processing request confirmation signal s4 (step S2608), and transitions to step S2012.

As described, based on the reception strength of a response signal for a signal confirming whether response is possible, the communications node according to the present embodiment, determines the transmission strength and destination of a data processing request signal. As a result, the request signal can be transmitted by a low power to a closer communications node. Therefore, data processing can be executed by a suitable communications counterpart and the power consumed for wireless communication can be decreased.

Further, the communications node according to the present embodiment, calculates based on the reception strength of the response signal, the distance between the transmission source of the response signal and the communications node, and from among the transmission sources, determines in ascending order of distance, communications nodes to which the data processing is to be requested. As a result, a request signal can be transmitted by a low power to a closer communications node and the power consumed for wireless communication can be reduced.

The communications node according to the present embodiment calculates based on the reception strength of the response signal, the smallest transmission strength among the transmission strengths that enable communication between the communications node and the request recipient communications node. As a result, a request signal can be transmitted by the minimum power and the power consumed for wireless communication can be reduced.

Further, when the data processing is data processing that can be divided into partial processes of a predetermined number for parallel processing, the communications node according to the present embodiment, selects as request recipients of the partial processes and selects from among the transmission sources of the response signals, communications nodes of a predetermined number or less, based on the reception strength of the response signals. As a result, data processing that can be processed in parallel, can be distributed to plural communications nodes.

The communications node according to the present embodiment, when selecting request recipient communications nodes, if the number of transmission source communications nodes of the response signal is greater than a predetermined number, selects from among the response signal transmission sources and based on the reception strength of the response signals, communications nodes of the predetermined number, as request recipients of the data processing. Further, the communications node, when selecting request recipient communications nodes, if the number of transmission source communications nodes of the response signal is the predetermined number or less, selects all of the transmission sources of the response signal, as request recipients of the data processing. As a result, the data processing can be distributed to more communications nodes and the power necessary for transmitting request signals requesting execution of the data processing and transfer of the processing results of the data processing can be reduced.

Further, the communications node according to the present embodiment determines based on the reception strength of the response signals and information corresponding to the processing volumes of the partial processes of the predetermined number, the partial process to be requested to respective communications nodes selected as a request recipient of the data processing, among the predetermined number partial processes. The communications node determines for the respective communications nodes selected as a request recipient of the data processing, the partial process to be requested thereto among the predetermined number partial processes, such that the processing volume of partial processes to be requested among the partial processes of the predetermined number increases in ascending order of response signal reception strength.

The communications node of the present embodiment, when execution of the requested data processing has been completed, transmits a request signal requesting transfer of processing results to a communications apparatus that aggregates the processing results. As a result, the processing results can be transferred to the communications apparatus.

The communications node according to the present embodiment, when a portion of the requested data processing has been completed, transmits a request signal that requests transfer of processing results to a communications apparatus that aggregates the processing results and that requests execution of the remaining data processing. As a result, a request signal requesting processing handover can be transmitted by a minimal amount of power, enabling the power consumed for wireless communication to be reduced.

The communications node according to the present embodiment substitutes into a function that obtains transmission strength, the reception strength of response signals for a signal confirming whether response is possible and thereby, obtains the transmission strength to a destination of a request signal for data processing.

The communications node according to the embodiment selects a destination of a request signal for data processing, based on the reception strength of response signals for a signal confirming whether response is possible, and controls the transmission strength to the selected destination. As a result, the data processing can be executed by a suitable communications counterpart.

The communications node according to the present embodiment, even when receiving a confirmation signal, refrains from transmitting a response signal for the confirmation signal when the remaining power of the battery is low. As a result, interruption of execution of the data processing consequent to exhaustion of the battery is prevented, enabling processing results of the data processing to be transferred to the communications apparatus sooner.

According to one aspect of the embodiments, data processing can be executed by suitable communications counterparts.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications node comprising:
   a first transmitting circuit configured to transmit to a plurality of communications nodes, a confirmation signal for confirming whether response is possible;
   a receiving circuit configured to receive from first communications nodes capable of responding among the plurality of communications nodes, a response signal for the confirmation signal transmitted by the first transmitting circuit;
   a selecting circuit configured to select from among the first communications nodes and based on reception strength of the response signal received by the receiving circuit, a second communications node to which execution of data processing is requested by the communications node;
   a strength calculating circuit configured to calculate based on the reception strength of the response signal from the second communications node selected by the selecting circuit, a transmission strength to the second communications node; and
   a second transmitting circuit configured to transmit to the second communications node and based on the transmission strength calculated by the calculating circuit, a request signal requesting execution of the data processing, wherein
   the data processing corresponds to an event of the communications node and can be divided into partial processes of a predetermined number for parallel processing,
   the selecting circuit selects from among the first communications nodes and based on respective reception strengths of the response signal received by the receiving circuit, a plurality of second communications nodes of the predetermined number or less, and
   the second transmitting circuit transmits to each second communications node among the plurality of second communications nodes selected by the selecting circuit, the request signal requesting a different partial process among the partial processes of the predetermined number.

2. The communications node according to claim 1 and further comprising
   a distance calculating circuit configured to calculate for each of the first communications nodes and based on the reception strength of the response signal thereof received by the receiving circuit, a distance between the first communications node and the communications node, wherein
   the selecting circuit selects from among the first communications nodes and based on each distance calculated by the distance calculating circuit, the second communications node to which execution of the data processing is requested by the communications node, and
   the strength calculating circuit calculates based on the distance to the second communications node calculated by the distance calculating circuit, the transmission strength to the second communications node.

3. The communications node according to claim 1, wherein
   the strength calculating circuit calculates the transmission strength that is smallest among transmission strengths enabling direct communication between the second communications node and the communications node.

4. The communications node according to claim 1, wherein
   the selecting circuit, when selecting the plurality of second communications nodes, selects based on the respective reception strengths of the response signal received by the receiving circuit, a plurality of first communications nodes of the predetermined number when a count of the first communications nodes is greater than the predetermined number and selects all of the first communications nodes when the count of the first communications nodes is the predetermined number or less.

5. The communications node according to claim 1 and further comprising
a determining circuit configured to determine for each second communications node among the plurality of second communications nodes selected by the selecting circuit, a partial process to be requested among the partial processes of the predetermined number, the determining circuit determining the partial process based on the reception strength of the response signal received by the receiving circuit and information corresponding to respective processing volumes of the partial processes of the predetermined number, wherein
the second transmitting circuit transmits to each second communications node among the plurality of second communications nodes, the request signal requesting the partial process determined therefor by the determining circuit.

6. The communications node according to claim 5, wherein
the determining circuit determines for each second communications node among the plurality of second communications nodes, the partial process to be requested among the partial processes of the predetermined number, such that the processing volumes of the partial processes requested increases in ascending order of the reception strength of the response signal.

7. The communications node according to claim 1 and further comprising:
a second receiving circuit configured to receive from a third communications node among the plurality of communications nodes, a second request signal requesting execution of second data processing; and
an executing circuit configured to execute the second data processing requested by the second request signal from by the second receiving circuit, wherein
the second transmitting circuit transmits to the second communications node selected by the selecting circuit, the second request signal requesting transfer of processing results of the second data processing executed by the executing circuit, to a communications apparatus that aggregates the processing results of the second data processing.

8. The communications node according to claim 1 and further comprising
a second receiving circuit configured to receive from a third communications node among the plurality of communications nodes, a second request signal requesting execution of second data processing; and
an executing circuit configured to execute a portion of the second data processing requested by the second request signal, wherein
the second transmitting circuit transmits to the second communications node selected by the selecting circuit, the second request signal requesting transfer of processing results of the portion of the second data processing executed by the executing circuit to a communications apparatus that aggregates the processing results of the second data processing, the request signal further requesting execution of the data processing excluding the portion of the data processing executed by the executing circuit.

9. The communications node according to claim 1, wherein
the strength calculating circuit calculates the transmission strength to the second communications node by providing the reception strength of the response signal from the second communications node selected by the selecting circuit into a function that when provided the reception strength of the response signal, obtains the transmission strength by which the request signal can reach the second communications node from the communications node.

10. A communications node comprising:
a first transmitting circuit configured to transmit to a plurality of communications nodes, a confirmation signal for confirming whether response is possible;
a receiving circuit configured to receive from first communications nodes capable of responding among the plurality of communications nodes, a response signal for the confirmation signal transmitted by the first transmitting circuit;
a selecting circuit configured to select from among the first communications nodes and based on reception strength of the response signal received by the receiving circuit, a second communications node to which execution of data processing is requested by the communications node;
a strength calculating circuit configured to calculate based on the reception strength of the response signal from the second communications node selected by the selecting circuit, a transmission strength to the second communications node;
a second transmitting circuit configured to transmit to the second communications node and based on the transmission strength calculated by the calculating circuit, a request signal requesting execution of the data processing;
a power storing circuit configured to store power generated internally;
a second receiving circuit configured to receive from a third communications node among the plurality of communications nodes, a second confirmation signal confirming whether response is possible by the communications node; and
a determining circuit configured to determine whether the power stored in the power storing circuit is at least a threshold, when the second receiving circuit receives the second confirmation signal, wherein
the second transmitting circuit transmits to the third communications node, a second response signal for the second confirmation signal, when the power is determined to be at least the threshold by the determining circuit, and refrains from transmitting to the third communications node, the second response signal for the second confirmation signal, when the power is determined to be less than the threshold by the determining circuit.

11. A system comprising:
a plurality of communications nodes; and
a communications apparatus configured to aggregate processing results of data processing from the plurality of communications nodes, wherein
a first communications node among the plurality of communications nodes:
transmits to a plurality of second communications nodes, a confirmation signal for confirming whether response is possible, receives from third communications nodes that can respond among the plurality of second communications nodes, a response signal for the transmitted confirmation signal, selects from among the third communications nodes and based on reception strength of the received response signal, a fourth communications node to which execution of the data processing is requested, calculates a transmission strength to the fourth communications node, based on the reception strength of the response signal from the selected fourth communications node, and transmits at the calculated transmission strength and to the fourth communications node, a request signal requesting execution of the data processing, wherein the data processing corresponds to an event of the communications node and can be divided into partial processes of a predetermined number for parallel processing, the first communications node selects from among the first communications nodes and based on respective reception strengths of the response signal received by the receiving circuit, a plurality of second communications nodes of the predetermined number or less, and the first communications node transmits to each second communications node among the plurality of second communications nodes selected by the selecting circuit, the request signal requesting a different partial process among the partial processes of the predetermined number.

12. A communications method of a communications node, the communications method comprising:

transmitting to a plurality of communications nodes, a confirmation signal for confirming whether response is possible;

receiving from first communications nodes capable of responding among the plurality of communications nodes, a response signal for the transmitted confirmation signal;

selecting from among the first communications nodes and based on reception strengths of the received response signal, a second communications node to which execution of the data processing is requested by the communications node;

calculating based on reception strength of the response signal from the selected second communications node, a transmission strength to the second communications node; and transmitting at the calculated transmission strength and to the second communications node, a request signal requesting execution of the data processing, wherein the data processing corresponds to an event of the communications node and can be divided into partial processes of a predetermined number for parallel processing, the selecting selects from among the first communications nodes and based on respective reception strengths of the response signal received by the receiving circuit, a plurality of second communications nodes of the predetermined number or less, and the second transmitting transmits to each second communications node among the plurality of second communications nodes selected by the selecting circuit, the request signal requesting a different partial process among the partial processes of the predetermined number.

* * * * *